(12) United States Patent
Matsumoto

(10) Patent No.: US 8,582,868 B2
(45) Date of Patent: Nov. 12, 2013

(54) IMAGE SIGNAL PROCESSING DEVICE AND IMAGE SIGNAL PROCESSING METHOD

(75) Inventor: Keizo Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 245 days.

(21) Appl. No.: 13/265,063

(22) PCT Filed: Jun. 22, 2010

(86) PCT No.: PCT/JP2010/004140
§ 371 (c)(1),
(2), (4) Date: Oct. 18, 2011

(87) PCT Pub. No.: WO2010/150519
PCT Pub. Date: Dec. 29, 2010

(65) Prior Publication Data
US 2012/0057780 A1 Mar. 8, 2012

(30) Foreign Application Priority Data

Jun. 24, 2009 (JP) ................................ 2009-149451
Jun. 24, 2009 (JP) ................................ 2009-149453
Jun. 24, 2009 (JP) ................................ 2009-149454

(51) Int. Cl.
*G06K 9/00* (2006.01)

(52) U.S. Cl.
USPC ........................................................ 382/154

(58) Field of Classification Search
None
See application file for complete search history.

(56) References Cited

U.S. PATENT DOCUMENTS

| | | |
|---|---|---|
| 6,532,008 B1 | 3/2003 | Guralnick |
| 6,573,928 B1 | 6/2003 | Jones et al. |
| 2006/0268104 A1 | 11/2006 | Cowan et al. |
| 2007/0188602 A1 | 8/2007 | Cowan et al. |
| 2008/0036696 A1 | 2/2008 | Slavenburg et al. |
| 2011/0025832 A1 | 2/2011 | Cowan et al. |
| 2011/0169824 A1 | 7/2011 | Fujinami et al. |

FOREIGN PATENT DOCUMENTS

| | | |
|---|---|---|
| JP | 56-106491 | 8/1981 |
| JP | 07-038925 | 2/1995 |
| JP | 08-331600 | 12/1996 |
| JP | 10-011607 | 1/1998 |
| JP | 2000-134644 | 5/2000 |
| JP | 3096614 | 10/2000 |
| JP | 2001-054142 | 2/2001 |
| JP | 2001-258052 | 9/2001 |
| JP | 2002-084551 | 3/2002 |
| JP | 2002-095013 | 3/2002 |
| JP | 2008-072699 | 3/2008 |
| JP | 2008-152061 | 7/2008 |
| JP | 2009-507401 | 2/2009 |
| WO | 2006/128066 | 11/2006 |
| WO | 2010/035492 | 4/2010 |

OTHER PUBLICATIONS

International Search Report issued Sep. 28, 2010 in International (PCT) Application No. PCT/JP2010/004140.

*Primary Examiner* — Stephen R Koziol
*Assistant Examiner* — Amandeep Saini
(74) *Attorney, Agent, or Firm* — Wenderoth, Lind & Ponack, L.L.P.

(57) ABSTRACT

When crosstalk is cancelled without considering the contents of an image signal, the effect of the crosstalk cancellation is sometimes obtained effectively, and sometimes not. In order to solve this problem, an image signal processing unit which cancels crosstalk in a three-dimensional image signal includes image adaptation control units (601, 705) which determine a first coefficient based on a first image signal which is one of a left-eye image signal and a right-eye image signal of the inputted three-dimensional image signal, and a second image signal which is the other of the left-eye image signal and the right-eye image signal of the inputted three-dimensional image signal corresponding to the first image signal, and a corrected signal generation unit (711) which corrects the first image signal based on the first coefficient and the second image signal, and generates the corrected first image signal.

4 Claims, 19 Drawing Sheets

IMAGE SIGNAL PROCESSING DEVICE AND IMAGE SIGNAL PROCESSING METHOD

TECHNICAL FIELD

The present application relates to image signal processing devices, image display apparatuses, and image signal processing methods, and more particularly, to a technique for more suitably suppressing crosstalk which causes a problem in displaying an image.

BACKGROUND ART

Patent Literature 1 discloses a technique to cancel crosstalk between right and left images in an image display apparatus that displays right and left image signals. In Patent Literature 1, before crosstalk is cancelled, a left-eye image signal and a right-eye image signal are compared to each other, a different image area is extracted from the image signals, and processing of reducing a contrast is performed on the image signal in the area. On the signal where this adjustment is performed, predetermined crosstalk processing is performed between the right image signal and left image signal.

CITATION LIST

Patent Literature

[PTL 1] Japanese Unexamined Patent Application Publication 2001-258052

DISCLOSURE OF INVENTION

Problems that Invention is to Solve

Conventional crosstalk processing described in Patent Literature 1, which facilitates improvement in a crosstalk reduction effect by crosstalk cancellation even in an image at around black level where crosstalk is readily visible, cancels crosstalk by extracting, based on a signal level difference between the right and left image signals, an image area where the signal level difference is large, suppressing the image level of portions with the higher image level in the extracted area, and increasing the image level of portions with the lower image level, so as to control the contrast between the right and left signals in advance. In the crosstalk cancellation processing, predetermined processing is performed regardless of the contents of images. Therefore, since this processing is performed using a constant cancellation coefficient regardless of the signal levels of the right and left image signals, the cancellation processing sometimes causes over-correction, or conversely, causes under-correction, thus, the cancellation coefficient is not optimally controlled.

Accordingly, in light of the above problems in this application, it is an object to achieve crosstalk processing that allows a more desirable image to be displayed by more suitably determining a cancellation coefficient to cancel crosstalk.

Means to Solve the Problems

In accordance with an aspect of the present invention for achieving the object, there is provided an image signal processing device that cancels crosstalk in three-dimensional (3D) image signals, the image signal processing device including: an image adaptation control unit configured to (i) receive a first image signal and a second image signal, the first image signal being one of a left-eye image signal and a right-eye image signal which correspond to each other in the inputted 3D image signals, and the second image signal being an other one of the left-eye image signal and the right-eye image signal, and (ii) determine a first coefficient and a second coefficient such that the larger a signal level of the second image signal relative to a signal level of the first image signal, the larger the first coefficient and the second coefficient become in at least a predetermined range, when the signal level of the first image signal is compared to the signal level of the second image signal; and a first conversion unit configured to convert the second image signal based on the first coefficient determined by the image adaptation control unit; a second conversion unit configured to convert the first image signal based on the second coefficient determined by the image adaptation control unit; and a corrected signal generation unit configured to correct the first image signal by subtracting the second image signal converted by the first conversion unit from the first image signal converted by second conversion unit.

According to this structure, the first image signal is corrected based on two image signals: the first image signal which is a signal that is desired to be originally generated, and the second image signal from which crosstalk to the first image signal originates; thus the effect of crosstalk cancellation processing can be adjusted in consideration of noise to the image signals.

Accordingly, compared with conventional crosstalk cancellation processing in which noise to an image signal is not considered, crosstalk can be cancelled by more suitably determining a cancellation coefficient so as to reduce defects in the processing such as over-correction and under-correction, thus it is possible to achieve crosstalk processing that allows a more desirable image to be displayed.

It is possible that the corrected signal generation unit includes: a first conversion unit configured to multiply the second image signal by the first coefficient to convert the second image signal, and a synthesizing unit configured to subtract the second image signal converted by the first conversion unit from the first image signal.

It is also possible that the image adaptation control unit is configured to compare a signal level of the second image signal to a signal level of the first image signal so as to determine the first coefficient such that the larger the signal level of the second image signal relative to the signal level of the first image signal, the larger the first coefficient becomes.

Therefore, compared with the first image signal, the stronger the second image signal from which crosstalk originates, in other words, the more readily the strong occurrence of crosstalk, the larger the amount of crosstalk cancellation applied to the second image signal becomes, allowing the effect of crosstalk cancellation to become stronger.

As a result, it is possible to achieve suitable crosstalk cancellation processing according to the signal strength of the right and left image signals that are inputted.

It is further possible that the image adaptation control unit is configured to compare a signal level of each of a plurality of pixel signals included in the second image signal to a signal level of a corresponding one of a plurality of pixel signals included in the first image signal so as to determine the first coefficients which include coefficients corresponding to the respective plurality of pixel signals included in the second image signal.

It is still further possible that the image adaptation control unit is configured to compare an average signal level of a plurality of pixel signals included in the second image signal to an average signal level of a plurality of pixel signals included in the first image signal so as to determine the first coefficient.

It is preferable that the image adaptation control unit is further configured to determine a second coefficient based on the first image signal and the second image signal, the corrected signal generation unit further includes a second conversion unit configured to convert the first image signal based on the second coefficient, and the synthesizing unit is configured to synthesize the second image signal converted by the first conversion unit and the first image signal converted by the second conversion unit.

It is still further possible that the image adaptation control unit is configured to compare the signal level of the first image signal to the signal level of the second image signal so as to determine the second coefficient such that the larger the signal level of the second image signal relative to the signal level of the first image signal, the larger the second coefficient becomes.

It is still further possible that the second conversion unit is configured to amplify the first image signal according to the second coefficient determined by the image adaptation control unit.

It is still further possible that the second conversion unit is configured to multiply the first image signal by a value generated by adding 1 to the second coefficient to convert the first image signal, and the synthesizing unit is configured to subtract the second image signal converted by the first conversion unit from the first image signal converted by the second conversion unit.

According to this structure, in order to enhance the effect of the crosstalk cancellation, the first image signal can be enlarged in addition to enlarging the second image signal that is subtracted from the first image signal.

Therefore, it is possible to prevent the first image signal from being excessively subtracted by a synthesizing unit, thus achieving more desirable image.

It is still further possible that the image signal processing device is provided for all of red, green, and blue image signals for each of a left eye and a right eye.

In accordance with another aspect of the present invention, there is provided an image display apparatus, including: the image signal processing device according to any one of Claims 1 to 9; and a display unit configured to display an image signal generated by the image signal processing device.

It should be noted that the present invention can be implemented not only as the above image signal processing device and image display apparatus, but also as: a method including steps performed by the device and the apparatus: a program for executing the method; and the like. Of course, the program can be distributed via a recording medium such as a Compact Disc-Read Only Memory (CD-ROM) or via a transmission medium such as the Internet.

Effects of the Invention

The invention described above allows more suitable crosstalk processing than the conventional one, and allows a more desirable image to be displayed.

BEST MODE FOR CARRYING OUT THE INVENTION

Embodiment 1

<1. Configuration of Image Display System>

Figure 1:
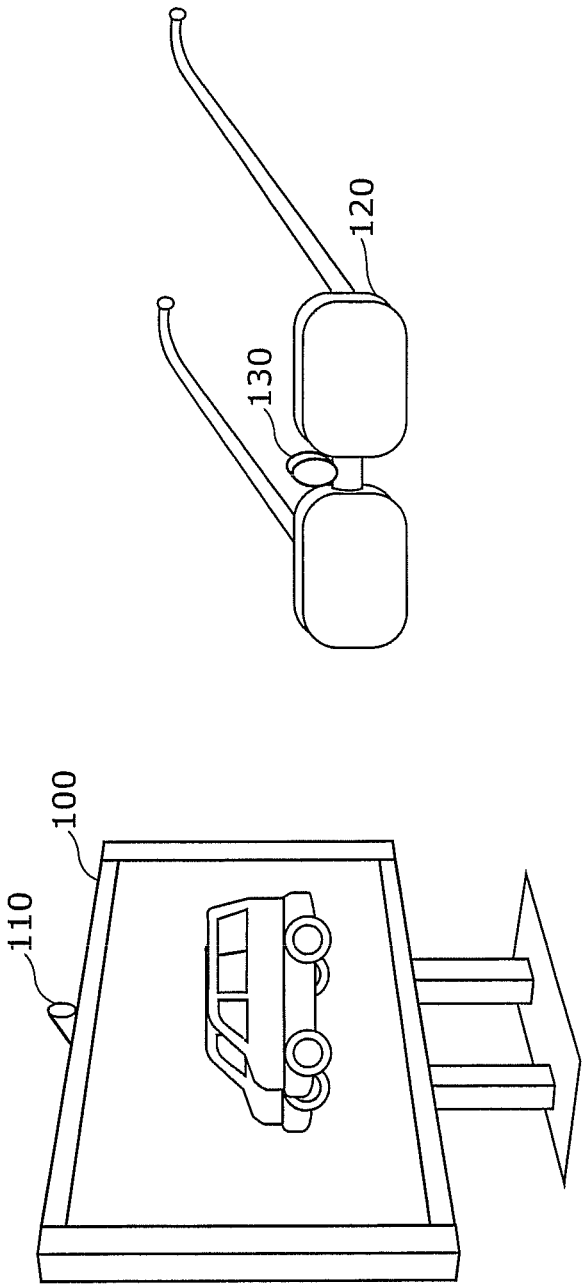
FIG. 1 is a configuration schematic diagram of an image display system including an image display apparatus and a pair of glasses for image viewing.

FIG. 1 is a diagram showing an image display system. The image display system includes an image display apparatus 100 and a pair of eyeglasses for image viewing 120 used to view an image displayed by the image display apparatus 100. This embodiment describes, as an example, a case where when a viewer sees an image displayed on the display surface of the image display apparatus 100 through the pair of eyeglasses for image viewing 120, the viewer can see the image as a three-dimensional image.

In the image display system according to this embodiment, the image display apparatus 100 alternately displays on the display surface, the left-eye frame and the right-eye frame in the cycle of 120 Hz, for example. The pair of eyeglasses for image viewing 120 uses optical filters to control incident light into the left eye and incident light into the right eye of the pair of eyeglasses for image viewing 120 in sync with an image generated on the display surface of the image display apparatus 100. The left-eye image and the right-eye image displayed by the image display apparatus 100 are different by the amount of disparity. The viewer detects the disparity from the images seen through the left eye and the right eye, and perceives that the image displayed by the image display apparatus 100 is a three-dimensional image.

More specifically, the image display apparatus 100 generates from the display surface, an image, such as a three-dimensional image (3D image), on which predetermined processing has been performed. From a synchronization signal transmission unit 110 of the image display apparatus 100, a signal synchronized (synchronization signal) with an image generated on the display surface of the image display apparatus 100 is transmitted. The pair of eyeglasses for image viewing 120 receives at a synchronization signal reception unit 130, the synchronization signal from the synchronization signal transmission unit 110. The pair of eyeglasses for image viewing 120 performs predetermined optical processing on the light incident into the right and left eyes based on the synchronization signal. The optical processing is, for example, to open and close right and left optical filters in sync with the synchronization signal from the synchronization signal transmission unit 110. That is to say, when the image display apparatus 100 displays the left-eye image on the display surface, the light incident into the right eye of the pair of eyeglasses for image viewing 120 (image displayed on the display surface of the image display apparatus 100) is shielded (reduced), and the light incident into the left eye is transmitted (increased). When the right-eye image is displayed on the image display surface, the right and left optical filters perform the inverse operation to the above.

This allows the viewer of the image display apparatus 100 to perceive that the displayed image is a three-dimensional image.

Note that although, in the above description, the case where the display cycle of the left-eye and right-eye frames is 120 Hz has been described as an example, the display cycle of 120 Hz may not be used. For example, the cycle of 96 Hz, 100 Hz, 144 Hz or the like may be used. Such a cycle may be changed depending on the types or the like of the contents of the image to be displayed.

<2. Crosstalk Phenomenon>

Figure 2:
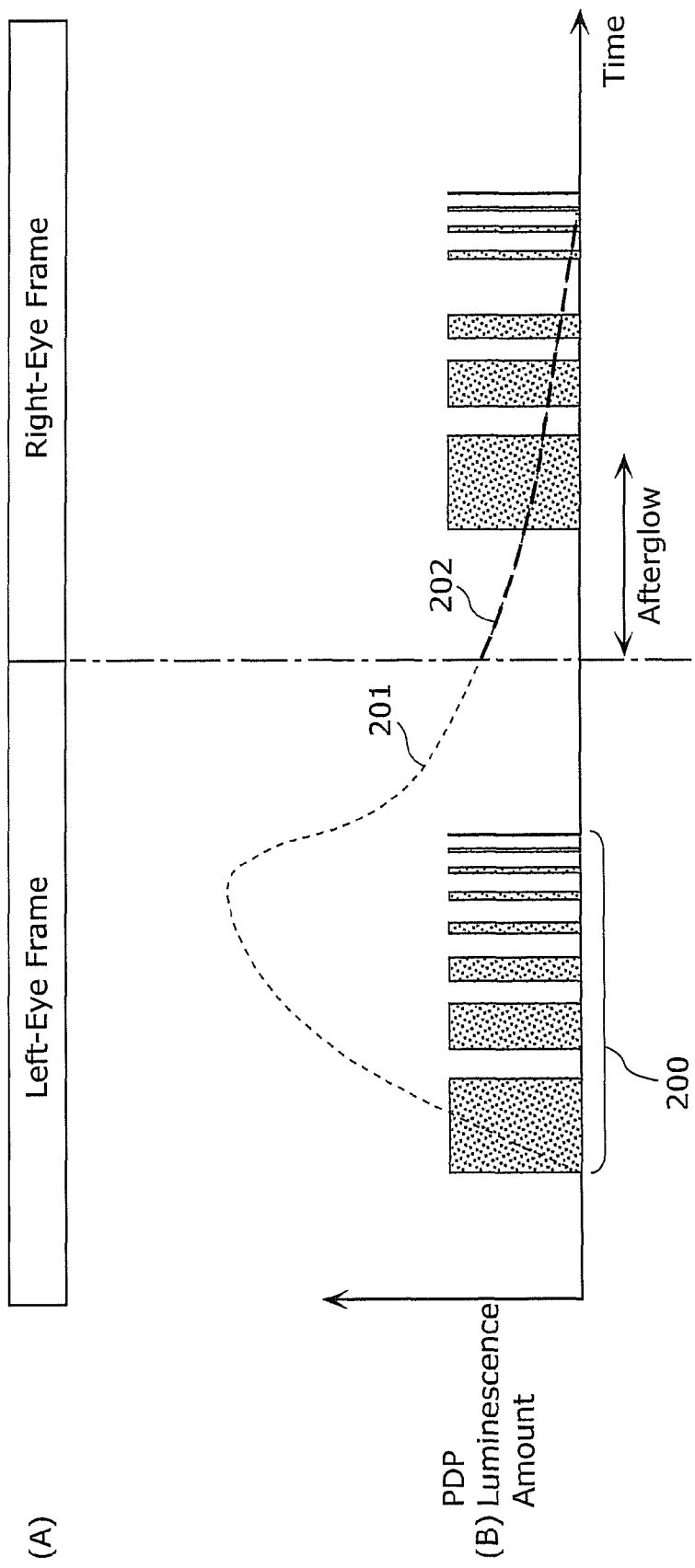
FIG. 2 is a graph plotting the reduction of afterglow (crosstalk).

FIG. 2 shows an example of the display operation of the image display apparatus 100 in the case where an image is displayed with a sub-field drive like a PDP (Plasma Display Panel). The image display apparatus 100 temporally alternately displays the left-eye image (left-eye frame) and the right-eye image (right-eye frame). In this case, the image is displayed on the image display surface by combining a plurality of sub fields. In the example of FIG. 2, the left-eye frame is displayed by combining a plurality of sub fields 200. Even when the control of lighting up the sub fields (control of displaying an image) is started, there is a temporal delay from when a pixel is actually controlled until when the phosphor of the pixel emits light. This delay relies on the response characteristic of the phosphor, and other causes. Therefore, even when the lighting-up control as shown in the sub field 200 is performed, the actual light emitting situation is delayed from the lighting-up control shown in the sub field 200, as shown in the graph 201.

Also in regard to when the light is extinguished, there is afterglow time even after the drive has been turned off, with exponential characteristics as a function of the amount of light emission, depending on similar phosphor characteristics. In FIG. 2, even when the lighting-up control of the sub field 200 is finished, and the display time of the left-eye frame is finished, the afterglow state of the left-eye frame sometimes continues, as shown in the graph 202. As a result, in the display time of the next right-eye frame, the afterglow of the left-eye frame remains. When the viewer sees this image, the image of the left-eye frame remains in the right-eye frame, and thus, this image is seen as a double image like a ghost phenomenon. This phenomenon is referred to as crosstalk.

Note that although, in the above description, by way of example, the case of a sub-field method has been described as the drive method of the display method, this invention is not limited thereto. Any display method in which an afterglow component occurs as crosstalk may apply.

<3. Structure of Image Display Apparatus>

Figure 3:
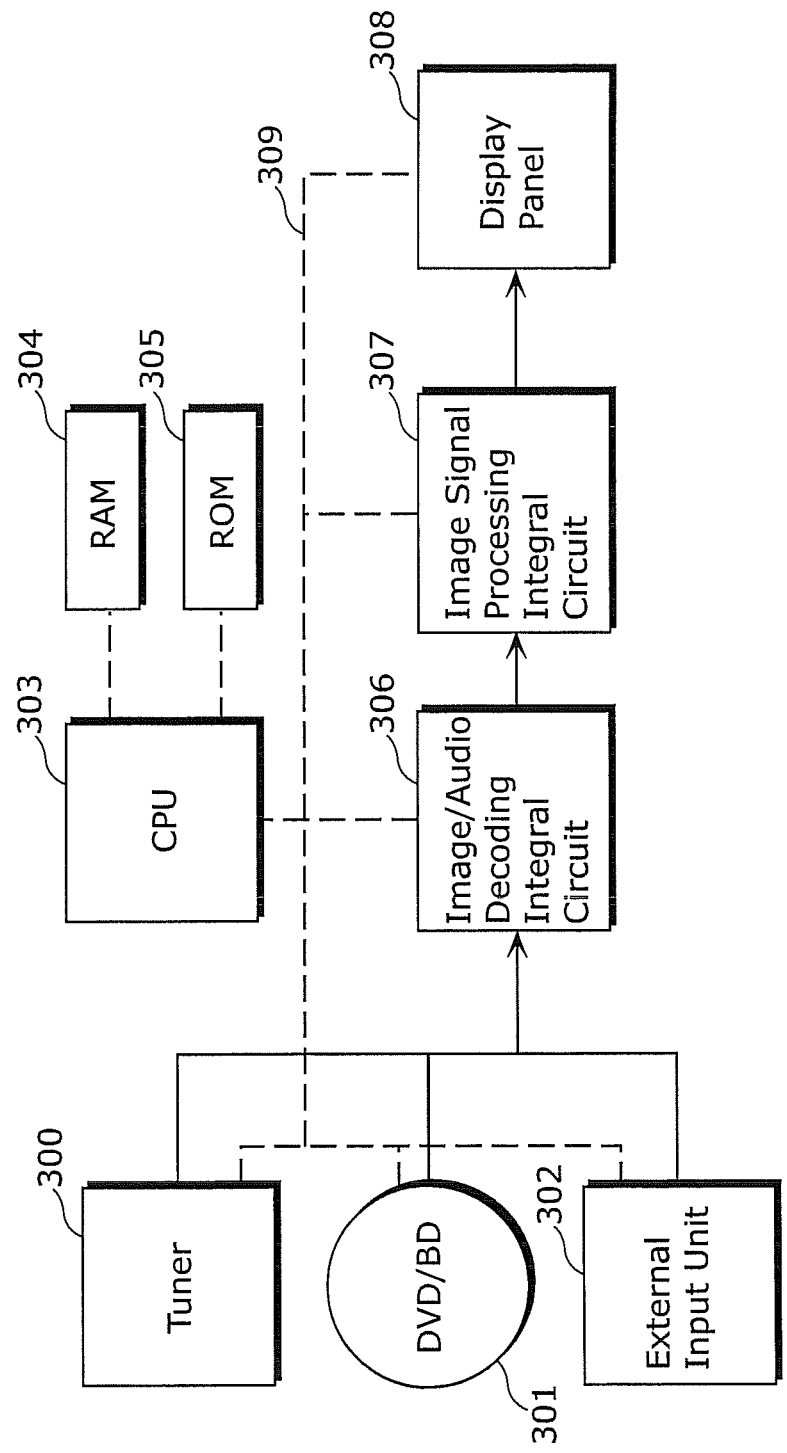
FIG. 3 is a diagram showing an example of a functional structure of the image display apparatus.

FIG. 3 is a diagram showing a functional structure of the image display apparatus 100 according to this embodiment. The image display apparatus 100 includes therein a tuner 300, a DVD/BD 301, an external input unit 302, a CPU 303, a RAM 304, a ROM 305, an image/audio decoding IC 306, an image signal processing IC 307, a display panel 308, and a bus 309.

The tuner 300 decodes a broadcast wave received at an antenna (not shown). The tuner 300 provides the decoded broadcast data to the image/audio decoding IC 306.

The DVD/BD 301 is an optical disc in which image data and the like are recoded in advance, such as, for example, an optical disc including a DVD (Digital Versatile Disc), and a BD (Blu-ray Disc). The image data read out from the DVD/BD 301 is provided to the image/audio decoding IC 306. Note that although a DVD and a BD are taken as an example in the description, other optical disc storage media may be used. In addition, without limited to an optical disc, a magnetic storage type disc like a hard disk, and a tape device and the like having no disc format may be used. That is to say, any storage medium which can record contents may be used regardless of the format of the medium.

The external input unit 302 serves as an interface which is used to receive image data from the external to the device through wired or wireless communication and the like. In this case, the image data inputted from the external device and the like is inputted into the image/audio decoding IC 306.

Although, in this embodiment, the tuner 300, the DVD/BD 301, and the external input unit 302 are taken as an example in the description, this invention is not limited thereto. Image data may be supplied using other methods.

The CPU 303 controls the entire image display apparatus. The CPU 303 reads out the program for control from the ROM 305, temporarily records in the RAM 304 various variables and the like required to execute the program, and executes the program. The CPU 303 is connected to other main components through the bus 309, through which the CPU 303 controls the other components.

The RAM 304 is a volatile information recording unit, which is typified by a memory such as a DRAM. The RAM 304 is used as a location where various variables are recorded when the CPU 303 executes the program, and as a location where data is temporarily stored when the image/audio decoding IC 306 decodes the image data.

The ROM 305 is a non-volatile information recording unit, which is typified by a memory device such as a mask ROM and a flash memory. The ROM 305 can be used as a location where a program executed by the CPU 303 is recorded, and various setting values related to the operation of the image display apparatus 100 are recorded.

The image/audio decoding IC 306 decodes image data, audio data and the like inputted from any one selected from the tuner 300, the DVD/BD 301, and the external input unit 302 described above. The inputted image data and audio data have been recorded by a predetermined method. The image/audio decoding IC 306 decodes (converts) these data recorded by the predetermined method, so as to allow the subsequent components to treat with the image, audio, and other data. Note that the predetermined method is typified by MPEG (Moving Picture Experts Group)-2, MPEG-4, H264, JPEG (Joint Photographics Experts Group) and the like, for example.

The image signal processing IC 307 performs predetermined image processing on the image data decoded by the image/audio decoding IC 306. The image processing herein includes color conversion processing by which coloring is made beautiful when the image is displayed on a display panel which will be described later, and processing of converting the frames of the decoded image data into a faster frame rate in order to display the movement of the images (frame-by-frame changes) more finely, for example. Note that the detail of the processing of the image signal processing IC 307 will be described later.

A display panel 308 displays an image signal processed by the image signal processing IC 307. For the display panel 308, for example, a PDP, an LCD (Liquid Crystal Display), a CRT (Cathode Ray Tube), an SED (Surface-conduction Electron-emitter Display) or the like is used. According to this embodiment, the display method for such a display is not limited.

<4. Image Signal Processing>

The image signal processing performed by the image signal processing IC 307 in FIG. 3 will be described with reference to FIG. 4.

Figure 4:
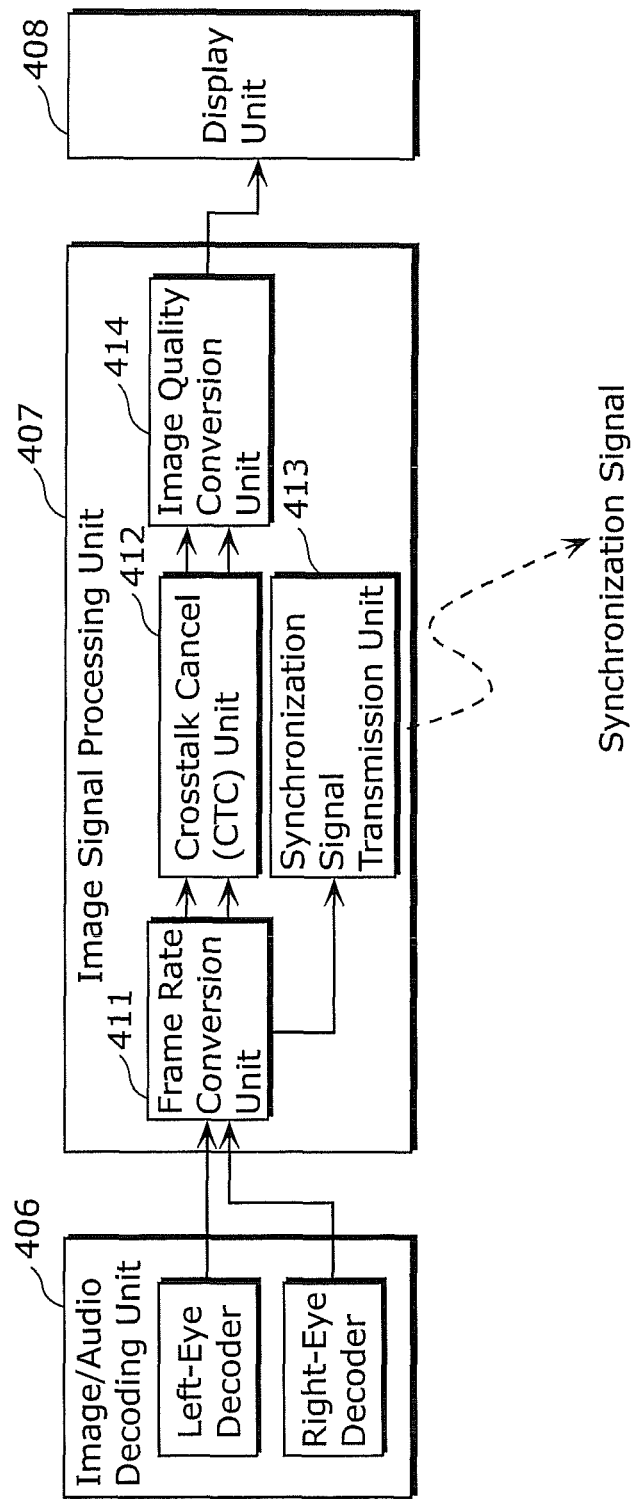
FIG. 4 is a diagram showing an example of a functional structure of an image signal processing unit.

An image/audio decoding unit 406 of FIG. 4 corresponds to the image/audio decoding IC 306 of FIG. 3. The image/audio decoding unit 406 decodes each of the left-eye image and the right-eye image. The left-eye image and the right-eye image decoded by the image/audio decoding unit 406 are provided to an image signal processing unit 407.

A display unit 408 corresponds to the display panel 308 of FIG. 3. The display unit 408 displays an image on the display surface according to the image signal processed by the image signal processing unit 407.

The image signal processing unit 407 corresponds to the image signal processing IC 307 of FIG. 3. The image signal processing unit 407 includes therein a frame rate conversion unit 411, a crosstalk cancel (hereinafter referred to as CTC) unit 412, a synchronization signal transmission unit 413, and an image quality conversion unit 414.

Figure 5:
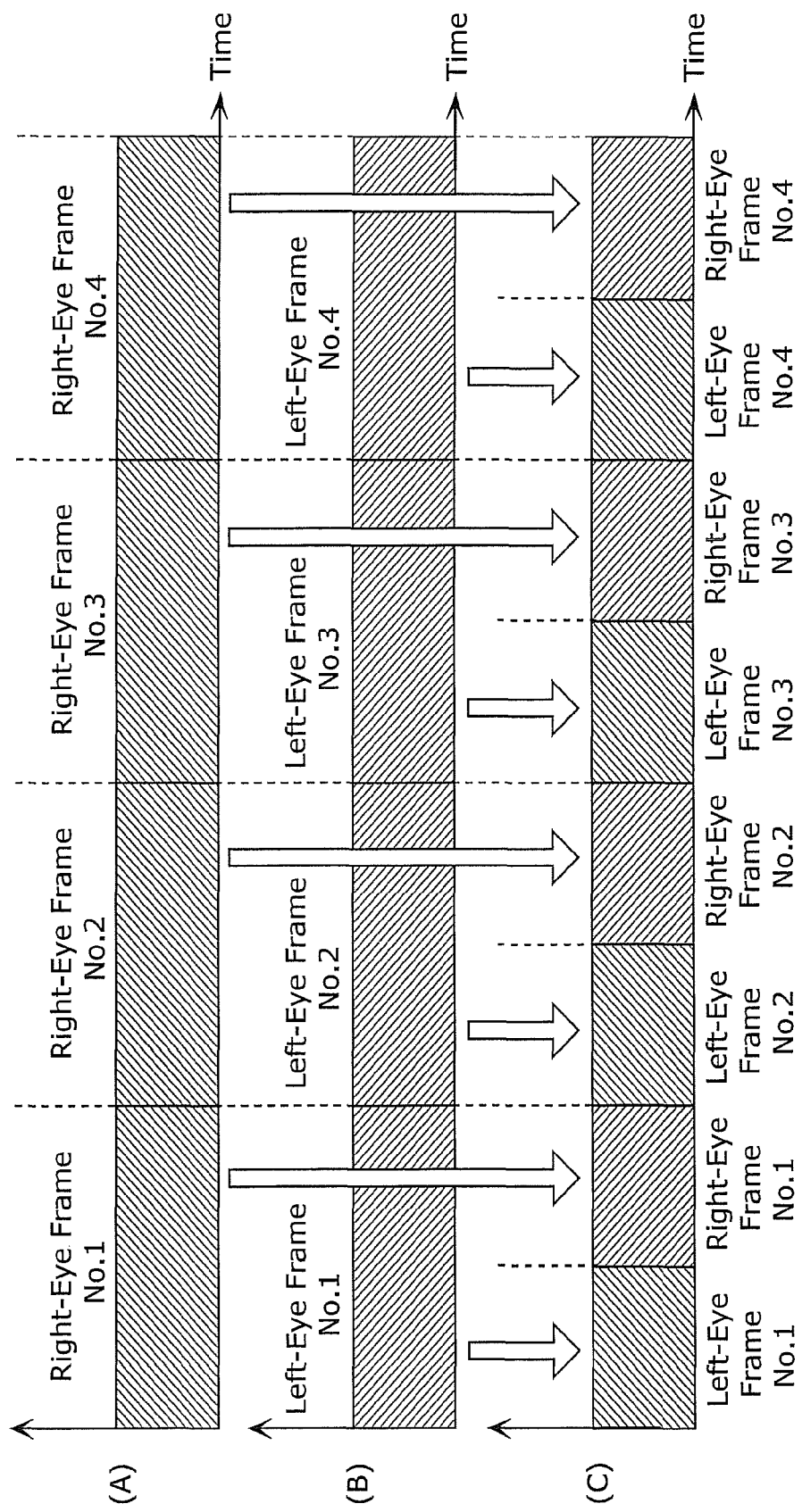
FIG. 5 is a diagram showing an example of a frame rate conversion.

The frame rate conversion unit 411 performs processing of doubling the frame rates of the left-eye image signal and the right-eye image signal decoded by the image/audio decoding unit 406. FIG. 5 shows an example of the processing of the frame rate conversion unit 411. The signal processing is performed to double the frame rates of the inputted right-eye frame signal (FIG. 5 (A)), and left-eye frame signal (FIG. 5(B)), so as to contain the right and left frames logically in the time interval of the original frame rate. Thus, an image signal can be formed in which both of right and left images are contained in the time interval of the original frame rate. Note that the image signal generated by the frame rate conversion unit 411 may be of a form in which both the right and left frames are contained in one signal as shown in FIG. 5(C), or a form in which the frame rate (clock signal) is doubled to generate both the right and left images independently, similarly to the inputs.

Note that the frame rate conversion unit 411 preferably provides the right and left image signals included in the image signal to be provided to the CTC unit 412 in a matching form. As shown in the example in FIG. 5(C), following the right-eye frame, there is the matching left-eye frame image, corresponding to the same time as the right-eye frame or within a predetermined time range. It suffices to have a predetermined regularity between the right and left frames in this way. Further, as another method, in addition to the image signal, the correspondence between the left-eye frame and the right-eye frame may be provided by another transmission unit and the like.

When displaying images on the display unit 408 described later, the CTC unit 412 switches the right and left frames sequentially or at every predetermined number of frames to perform signal processing for suppressing the afterglow (crosstalk) generated at the time of switching. The detail of the CTC unit 412 will be described later.

The synchronization signal transmission unit 413 transmits a synchronization signal in sync with the right-eye and left-eye frames to the outside based on the frame rate generated by the frame rate conversion unit 411. The synchronization signal is transmitted to the pair of eyeglasses for image viewing 120 of FIG. 1, and based on the synchronization signal, the pair of eyeglasses for image viewing 120 controls the right and left optical filters so that the viewer sees the 3D image and the like. The synchronization signal may be transmitted by any transmission medium such as optics of infrared rays and the like, wireless communication such as wireless remote control (e.g., ZigBee), Bluetooth and the like, and a dedicated wired cable. Any method which can transmit synchronization information between the image display apparatus 100 and the pair of eyeglasses for image viewing 120 may be used.

The image quality conversion unit 414 corrects an image signal that is to be displayed according to the display characteristics of the display unit 408 in the subsequent stage. For example, the image quality conversion unit 414 performs various types of image signal processing, for example, when the image display apparatus 100 changes the brightness of the display image based on the APL (Average Picture Level), when color gamut conversion is performed to adapt the color gamut of an inputted signal to the color gamut of the display device, and when the fine adjustment of color information of the inputted image is performed according to the display characteristics of the display unit.

As described above, in the image signal processing IC 307, various types of processing are performed on the decoded image signal, and the changed image signal is provided to the display unit 408. This allows more desirable image to be displayed.

<5. Crosstalk Cancel (CTC) Unit>

Figure 6:
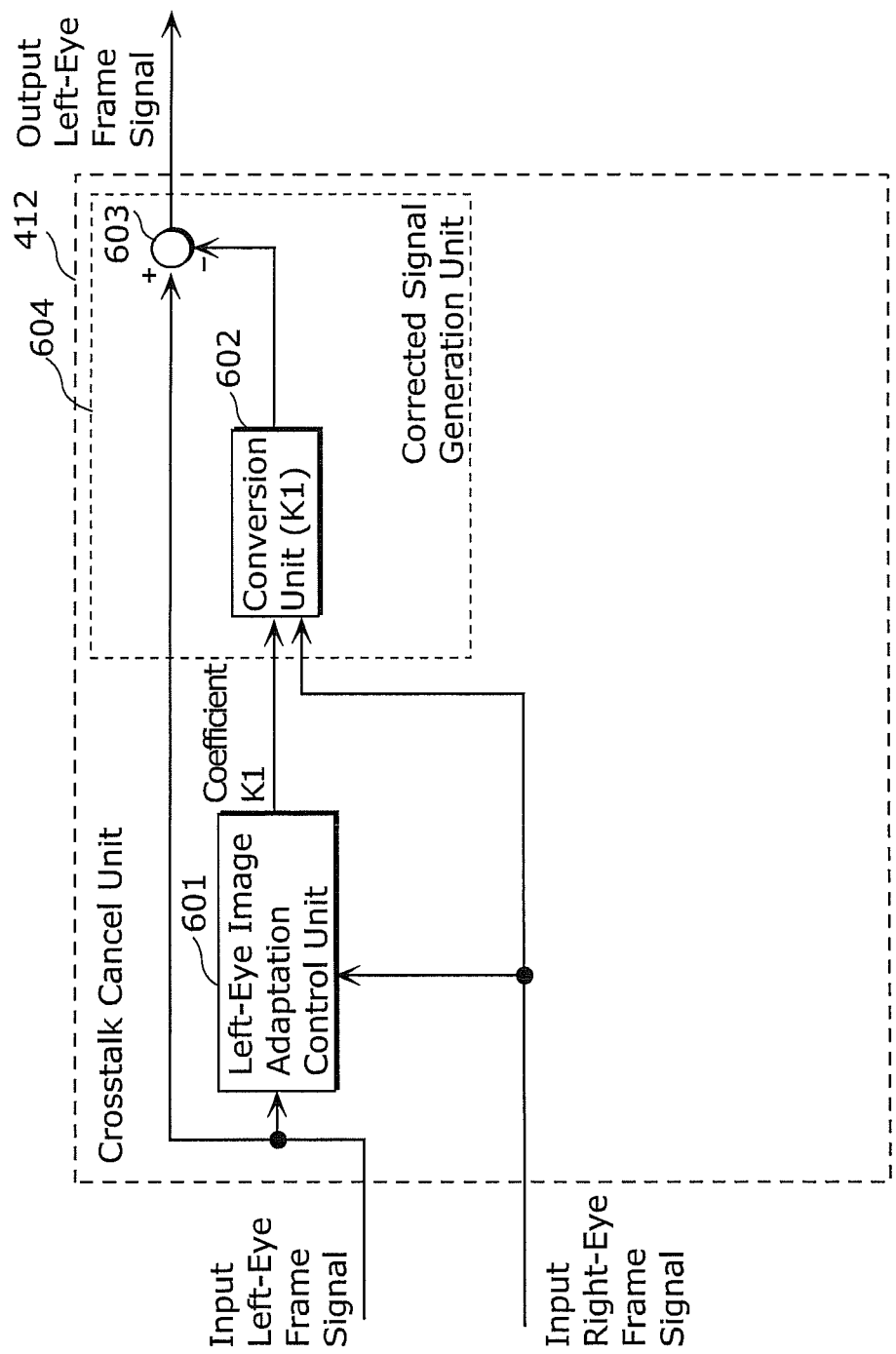
FIG. 6 is a diagram showing a part of an example of the structure of CTC (crosstalk cancellation).

The outline of the function of the CTC unit 412 in FIG. 4 will be described with reference to FIG. 6. FIG. 6 shows an example of a part of structure of the CTC unit 412 according to this embodiment. The CTC unit 412 of FIG. 6 includes a left-eye image adaptation control unit 601 and a corrected signal generation unit 604, and the corrected signal generation unit 604 includes a conversion unit 602 and a synthesizing unit 603.

The CTC unit 412 receives, as an input, an input left-eye frame signal and an input right-eye frame signal. These input signals are inputted into the left-eye image adaptation control unit 601.

The left-eye image adaptation control unit 601 calculates a coefficient K1 used for crosstalk cancellation from the input left-eye frame signal and the input right-eye frame signal. This coefficient K1 is determined from the relative relationship between the input left-eye frame signal and the input right-eye frame signal that are inputted, and the like. The details thereof will be described later.

The corrected signal generation unit 604 uses the determined K1 and the input right-eye frame signal to correct the input left-eye frame signal, and generates the corrected input left-eye frame signal. More specifically, the conversion unit 602 and the synthesizing unit 603 perform the following processing.

The conversion unit 602 performs predetermined conversion on the input right-eye frame signal based on the determined coefficient K1.

The synthesizing unit 603 synthesizes the input left-eye frame signal and the input right-eye frame signal that is converted by the coefficient K1 by the conversion unit 602. The synthesis herein represents that the input right-eye frame signal that is converted by the coefficient K1 by the conversion unit 602 is subtracted from the input left-eye frame signal to generate an output left-eye frame signal.

The output signal generated by the synthesizing unit 603 is provided from the CTC unit 412 as an output left-eye frame signal in which crosstalk is suppressed.

That is to say, the CTC unit 412 which cancels crosstalk in a three-dimensional image signal includes the left-eye image adaptation control unit 601 which determines K1 that is a first coefficient based on the first image signal which is a left-eye image signal of the inputted three-dimensional image signal, and the second image signal which is a right-eye image signal of the inputted three-dimensional image signal (namely, the right-eye image signal corresponds to the left-eye image signal), and the corrected signal generation unit 604 which corrects the first image signal based on the first coefficient and the second image signal, and generates the corrected first image signal.

Here, the corrected signal generation unit 604 includes the conversion unit 602 which is a first conversion unit, and the synthesizing unit 603; the conversion unit 602 multiplies the inputted second image signal by the first coefficient K1 to convert the second image signal, and the synthesizing unit 603 subtracts an image signal converted by the conversion unit 602 from the inputted first image signal.

In addition, the left-eye image adaptation control unit 601 compares the signal level of the second image signal to the signal level of the first image signal, and determines the first coefficient K1 in such a way that the larger the signal level of the second image signal relative to the signal level of the first image signal, the larger the first coefficient K1 becomes.

More specifically, the left-eye image adaptation control unit 601 may compare (a) the signal level of each of a plurality of pixel signals included in the second image signal to (b) the signal level of each of a plurality of pixel signals included in the first image signal to determine the first coefficient K1 which includes a coefficient corresponding to each of the plurality of pixel signals included in the second image signal.

Alternatively, the left-eye image adaptation control unit 601 may compare (a) the average signal level of the plurality of pixel signals included in the second image signal to (b) the average signal level of the plurality of pixel signals included in the first image signal to determine the first coefficient K1.

The details will be described below.

Figure 7:
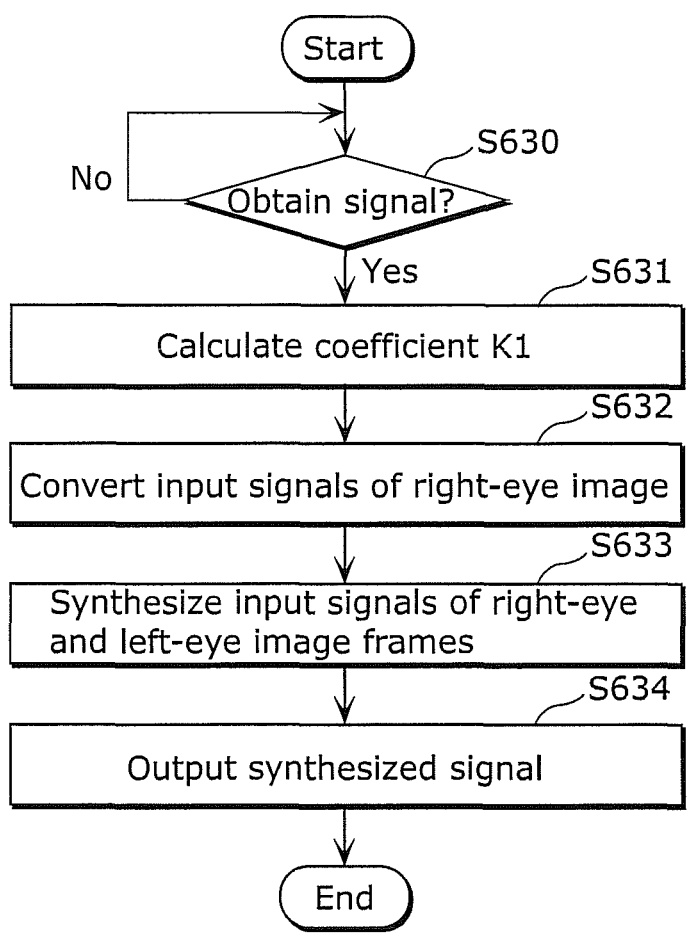
FIG. 7 is a flowchart showing the flow of CTC processing.

FIG. 7 is a flowchart showing a flow of CTC processing in this embodiment.

The left-eye image adaptation control unit 601 awaits the obtaining of the input right-eye frame signal and input left-eye frame signal inputted into the CTC unit 412 (loop in the case of No in S630).

The left-eye image adaptation control unit 601 that obtains the input left-eye frame signal and the input right-eye frame signal (Yes in S630) calculates the coefficient K1 from the input left-eye frame signal and the input right-eye frame signal in a method described later (S631).

Next, the conversion unit 602 uses K1 to convert the input right-eye frame signal (S632). More specifically, the conversion unit 602 multiplies the input right-eye frame signal by the coefficient K1 as gain, for example.

Next, the synthesizing unit 603 synthesizes the input left-eye frame signal and the converted input right-eye frame signal (S633). More specifically, the input right-eye frame signal is subtracted from the input left-eye frame signal, for example.

Thereafter, the synthesizing unit 603 generates the synthesized signal as an input left-eye frame signal (S634).

Note that, for purposes of illustration, FIG. 6 describes the outline of the structure required to reduce the afterglow from the input left-eye frame signal (cancel crosstalk).

Therefore, it is considered that crosstalk processing is performed on both right and left images similarly.

That is to say, referring to FIG. 8 described later, the CTC unit 412 which is an image signal processing unit that cancels crosstalk in a three-dimensional image signal may include the image adaptation control unit 601 or 705 which determines a first coefficient based on a first image signal which is one of a left-eye image signal and a right-eye image signal of an inputted three-dimensional image signal, and a second image signal which is the other of the left-eye image signal and the right-eye image signal of the inputted three-dimensional image signal corresponding to the first image signal, and a corrected signal generation unit 711 which corrects the first image signal based on the first coefficient and the second image signal, and generates the corrected first image signal.

An example of a case where crosstalk processing is performed on both right and left images will be described in more detail below.

Figure 8:
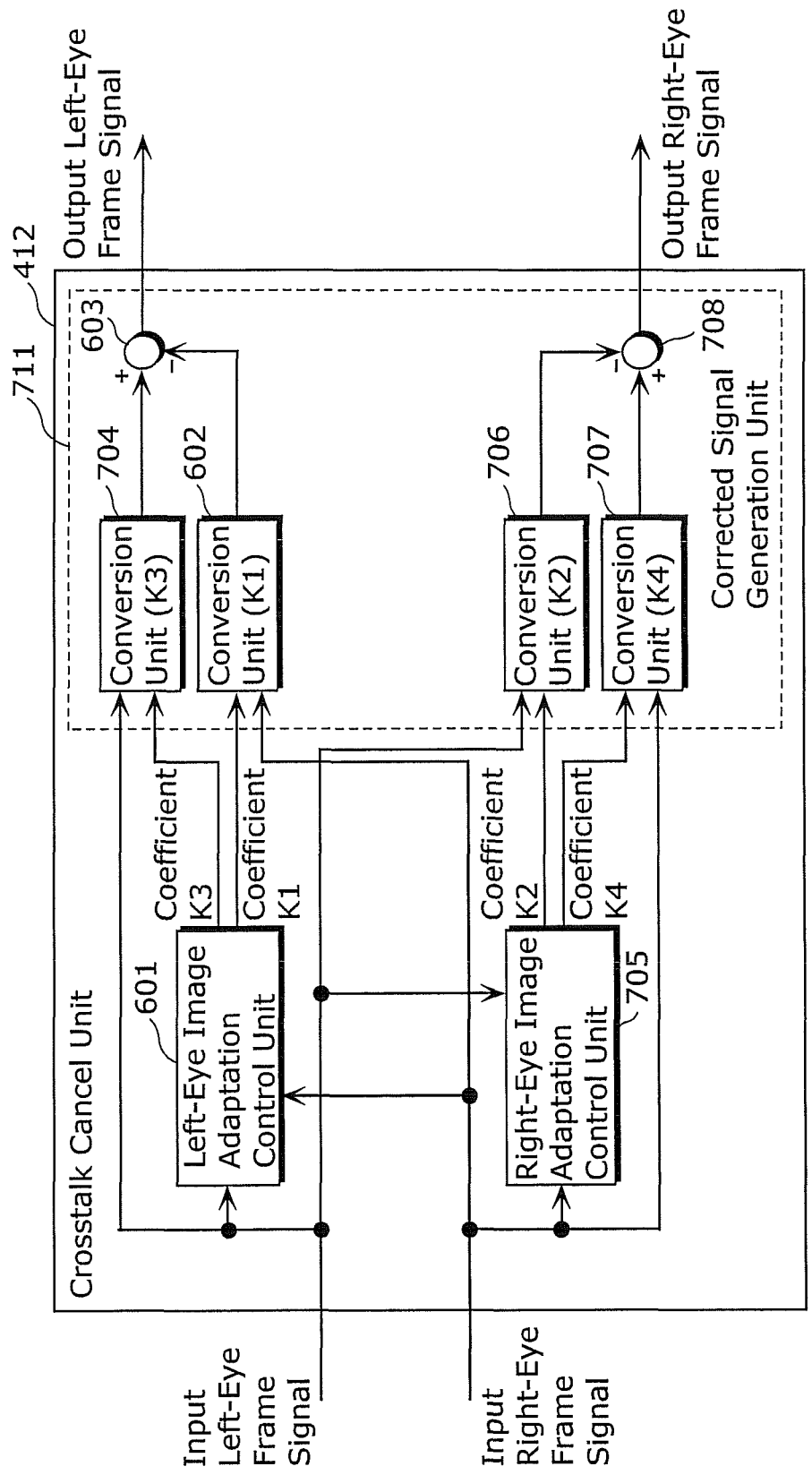
FIG. 8 is a diagram showing an example of the structure of the CTC according to a first embodiment.

FIG. 8 is a diagram of a case where the above structure has been configured to handle input right-eye and left-eye image signals. The structure of FIG. 8 uses the structure of FIG. 6 to handle the crosstalk cancellation of the input right-eye frame signal and the input left-eye frame signal, and further includes conversion units 704 and 707.

The CTC unit of FIG. 8 includes as components the left-eye image adaptation control unit 601, a right-eye image adaptation control unit 705, and a corrected signal generation unit 711, and the corrected signal generation unit 711 includes conversion units 602, 704, 706, and 707, and synthesizing units 603 and 708.

The left-eye image adaptation control unit 601 calculates and determines coefficients K1 and K3 which are multiplied to the image signal of the left-eye frame and the image signal of the right-eye frame from the image signal of the inputted left-eye frame, and the image signal of the right-eye frame corresponding to the left-eye frame.

Contrary to the left-eye image adaptation control unit 601, the right-eye image adaptation control unit 705 calculates and determines coefficients K2 and K4 which are multiplied to the image signal of the right-eye frame and the image signal of the left-eye frame from the image signal of the inputted right-eye frame, and the image signal of the left-eye frame corresponding to the right-eye frame. Note that the determination method of the coefficients K1, K2, K3, and K4 will be described later.

Note that here, the right-eye frame corresponding to the left-eye frame, or the left-eye frame corresponding to the right-eye frame means the frames having display times, at which the respective right-eye and left-eye frames are displayed, that are on the same time or are identical within a predetermined time range.

The corrected signal generation unit 711 corrects the input left-eye frame signal and the input right-eye frame signal, which are in turn generated as an output left-eye frame signal and an output right-eye frame signal, respectively.

The conversion unit 602 performs a predetermined conversion processing on the input right-eye frame signal based on the coefficient K1 determined by the left-eye image adaptation control unit 601. Here, the predetermined conversion processing is as follows: for example, when the coefficient K1 indicates the magnitude of the signal by which the crosstalk (afterglow) of the input right-eye frame signal is cancelled (suppressed) from the input left-eye frame signal, the conversion performed by the conversion unit 602 becomes one in which the input right-eye frame signal is multiplied by the coefficient K1

The conversion unit 704 converts the input left-eye frame signal based on the coefficient K3 determined by the left-eye image adaptation control unit 601.

For example, when the coefficient K3 is the value indicating the amplification factor of the input left-eye frame signal, the conversion unit 704 adds the result obtained by multiplying the input left-eye frame signal by the coefficient K3 to the input left-eye frame signal.

In this case, when the value of the coefficient K3 is a positive value, it can also be the that the conversion unit 704 multiplies the input left-eye frame signal by (1+K3).

The synthesizing unit 603 synthesizes the input left-eye frame signal converted by the conversion unit 704 and the input right-eye frame signal converted by the conversion unit 602. As an example of synthesis, for example, if suppression is performed by cancelling the crosstalk portion, the input right-eye frame signal converted by the conversion unit 602 is subtracted from the input left-eye frame signal converted by the conversion unit 704.

The synthesizing unit 603 generates the synthesized signal as an output left-eye frame signal. The output left-eye frame signal is the image signal obtained by suppressing (cancelling) the crosstalk portion occurring in the input right-eye frame signal from the input left-eye frame signal.

The crosstalk in the input right-eye frame signal is cancelled by the right-eye image adaptation control unit 705, the conversion units 706 and 707, and the synthesizing unit 708 as in the case of the input left-eye frame signal.

Note that as described above, since the processing performed on the input right-eye frame signal and the processing performed on the input left-eye frame signal are symmetric, temporarily, paying attention only on the input left-eye frame signal, the left-eye image adaptation control unit 601 determines K1 which is the first coefficient, and K3 which is the second coefficient based on the first image signal which is the input left-eye frame signal that is inputted, and the second image signal which is the input right-eye frame signal corresponding to the first image signal.

In addition, the corrected signal generation unit 711 further includes the conversion unit 704 which is a second conversion unit that converts the inputted first image signal based on the second coefficient.

Here, the synthesizing unit 603 synthesizes the image signal converted by the conversion unit 602 and the image signal converted by the conversion unit 704.

In addition, the left-eye image adaptation control unit 601 compares the signal level of the first image signal to the signal level of the second image signal, and determines the first and second coefficients in such a way that the larger the signal level of the second image signal relative to the signal level of the first image signal, the larger the first and second coefficients become.

Thereafter, the second conversion unit 704 converts the inputted first image signal according to the second coefficient determined by the left-eye image adaptation control unit 601.

In addition, the first conversion unit 602 converts the second image signal according to the first coefficient determined by the left-eye image adaptation control unit 601.

Here, the second conversion unit 704 multiplies the inputted first image signal by the value generated by adding 1 to K3 (second coefficient) in order to convert the first image signal.

In addition, the first conversion unit 602 multiplies the inputted second image signal by the first coefficient to convert the second image signal.

Further, the synthesizing unit 603 subtracts the image signal converted by the first conversion unit from the image signal converted by the second conversion unit.

Figure 9:
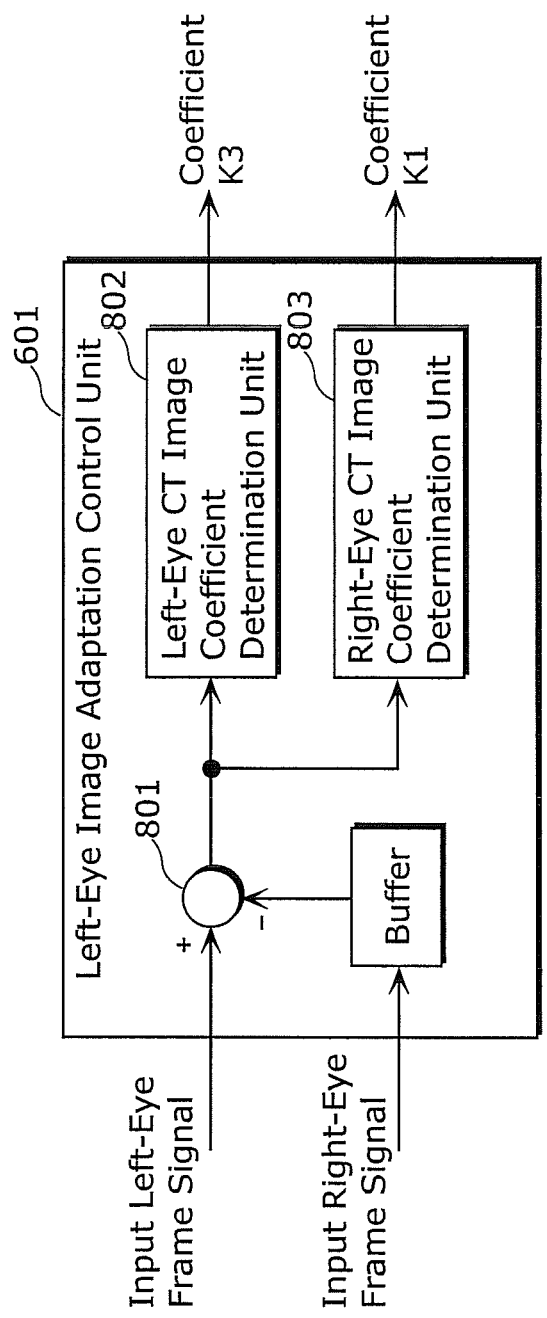
FIG. 9 is a diagram showing an example of the structure of a left-eye image adaptation control unit according to the first embodiment.

An example of the structure of the left-eye image adaptation control unit 601 is shown in FIG. 9. The left-eye image adaptation control unit 601 includes therein a signal comparison unit 801, a left-eye CT (crosstalk) image coefficient determination unit 802, and a right-eye CT image coefficient determination unit 803.

The signal comparison unit 801 calculates the signal level ratio between the input left-eye frame signal and the input right-eye frame signal that are inputted. For the signal level ratio, a differential image signal can be used which is obtained by subtracting a right-eye CT image signal (input right-eye frame signal) which exerts the influence of crosstalk from the left-eye CT image signal (input left-eye frame signal) which is affected by the crosstalk. The calculated signal level ratio is provided to the left-eye CT image coefficient determination unit 802 and the right-eye CT image coefficient determination unit 803 in the subsequent stage.

The left-eye CT image coefficient determination unit 802 calculates coefficient K3 which is multiplied to the input left-eye frame signal based on the signal level ratio calculated by the signal comparison unit 801, for example, a differential image signal. The calculation of the coefficient K3 may be performed according to the graph shown in FIG. 10 (A), for example. In this case, the gain K3 is determined based on the value of the differential image signal (signal level ratio) calculated by the signal comparison unit 801.

Figure 10:
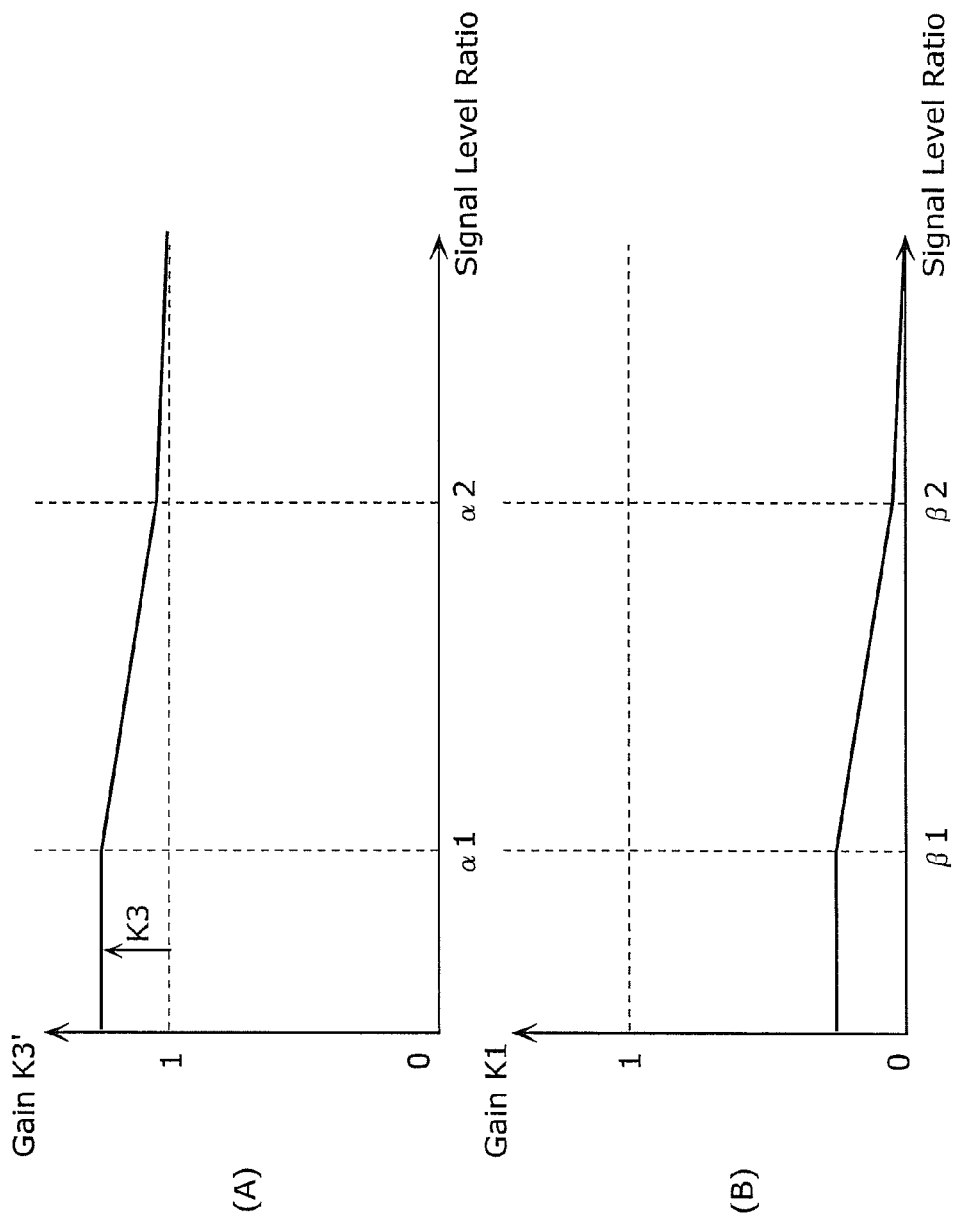
FIG. 10 shows graphs plotting examples of coefficients K1 and K3 determined by the left-eye image adaptation control unit according to the first embodiment.

FIG. 10 (A) shows an example of the determination of K3.

The vertical axis represents the magnitude of the gain K3' (i.e., 1+K3).

In addition, the horizontal axis represents the magnitude of the signal level ratio. When the signal level ratio represent a result of subtraction of one signal level from the other signal level, 0 is included between α1 and α2 (that is to say, two signal levels are equal).

In the portions where the signal level ratio is less than a threshold α1, the gain K3 is kept in a constant value. In the portions where the signal level ratio is larger than or equal to a threshold al and less than α2, the gain K3 is reduced as the signal level ratio is increased. In the portions where the signal level ratio is larger than or equal to the threshold α2, the rate of decrease of the gain K3 eases up.

Similarly to the left-eye CT image coefficient determination unit 802, the right-eye CT image coefficient determination unit 803 calculates the gain K1 which is multiplied to the input right-eye frame signal based on the signal level ratio calculated by the signal comparison unit 801.

FIG. 10 (B) shows an example of the determination of the gain K1

The vertical axis represents the magnitude of the gain K1. As shown in FIG. 10 (B), the gain K1 takes the value less than or equal to 1.0 times at any time.

The horizontal axis represents the magnitude of the signal level ratio. When the signal level ratio represent a result of subtraction of one signal level from the other signal level, 0 is included between β1 and β2 (that is to say, two signal levels are equal).

In the example of FIG. 10 (B), the gain K1 becomes a constant value when the signal level ratio is less than a threshold 131, the gain K1 is reduced when the signal level ratio is larger than or equal to the threshold β1 and less than β2, and the rate of decrease of the gain K1 eases up when the signal level ratio is larger than or equal to β2.

In the example of FIG. 10 (B), when the value of the signal level ratio is relatively small, in other words, when the image frame signal which exerts the influence of crosstalk is larger than the image frame signal which is affected by the crosstalk by a predetermined value or higher (for example, the portions less than the threshold β1), even when crosstalk is cancelled, the effect is considered to be small. Therefore, the value of the gain K1 is not almost changed, and is kept constant.

This is described with reference to FIG. 11. Since the signal of a right-eye frame 900 is extremely larger than the signal of a left-eye frame 901, the effect of the afterglow of the right-eye frame 900 becomes larger than or equal to the signal level of the left-eye frame 901. Therefore, this case is considered that even when crosstalk is cancelled, the afterglow of the right-eye frame 900 is difficult to cancel.

Next, in the example of FIG. 10 (B), when the signal level ratio is at the intermediate level, in other words, when the magnitude of the signal of the frame which exerts the influence of crosstalk and the magnitude of the signal of the frame which is affected by the crosstalk are contained in a predetermined range (the portions larger than or equal to the threshold β1 and less than β2), this is the portions where the effect of the crosstalk cancellation is relatively obtained. Therefore, this is a case where the value of the gain K1 is actively changed according to the level difference between the right and left signals, and optimized so that the coefficient is no longer excessive or insufficient.

Figure 11:
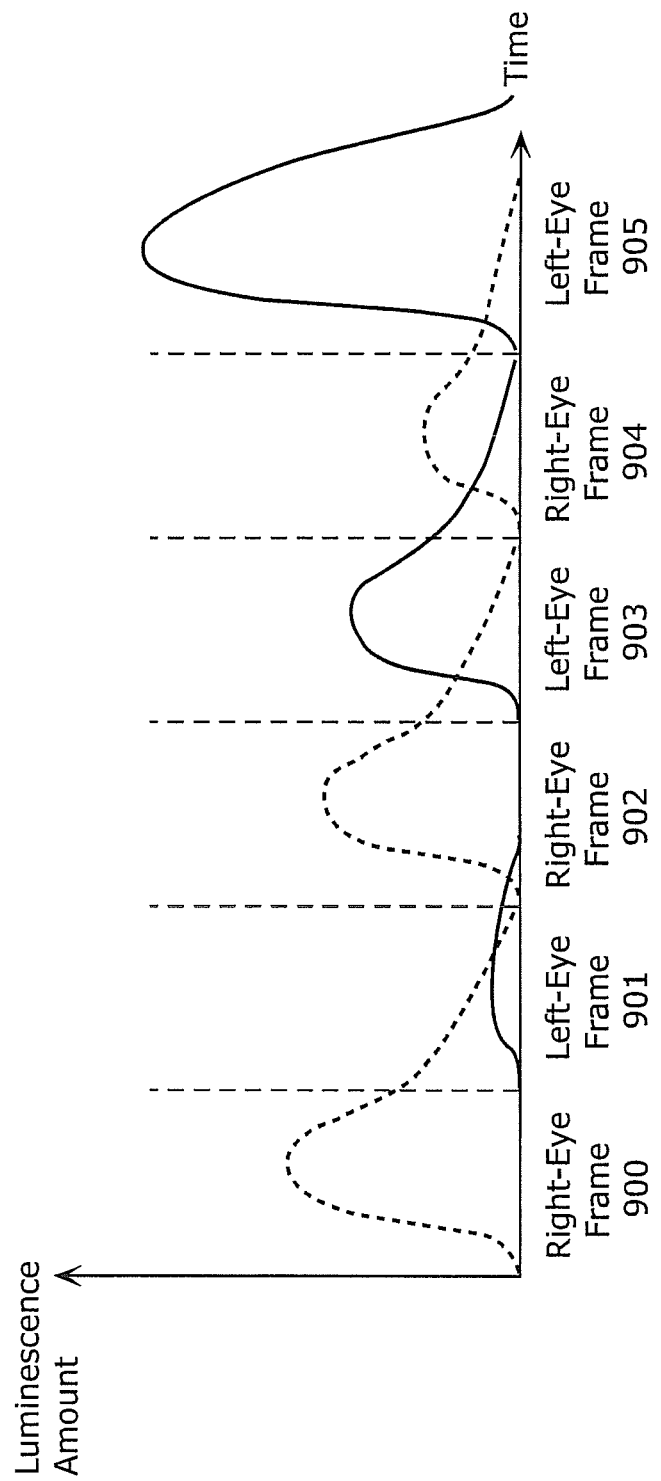
FIG. 11 is a graph plotting the relationship between a right frame and a left frame.

In the example of FIG. 11, the relationship between a right-eye frame 902 and a left-eye frame 903 corresponds to this case. In this case, it can be considered that since the signals of the right-eye frame 902 and the left-eye frame 903 are almost the same (the relative difference of the signal levels is within the predetermined range), the effect of the crosstalk cancellation is easy to obtain.

In the example of FIG. 10 (B), when the signal level ratio is relatively large, in other words, when the signal of the frame which exerts the influence of crosstalk is smaller than the signal of the frame which is affected by the crosstalk by a predetermined value or higher (the portions higher than or equal to the threshold β2), since the signal of the frame which is affected by the crosstalk is relatively large, this is a case where inherently the influence of the crosstalk is not stand out readily. In the example of FIG. 11, the relationship between a right-eye frame 904 and a left-eye frame 905 corresponds to this case.

Therefore, the left-eye image adaptation control unit 601 determines the coefficients K1 and K3 based on both input signals of the input left-eye frame signal and the input right-eye frame signal. Note that the determination method of the coefficients K1 and K3 shown in FIG. 10 is an example, and this embodiment is not particularly limited to this example. Any method which determines the coefficients K1 and K3 based on the image frame signal constituting the inputted image may be used.

Note that the right-eye image adaptation control unit 705 also determines the gains K2 and K4 based on the image signal to be inputted similarly to the left-eye image adaptation control unit 601.

In addition, the methods of determining the coefficients of the left-eye image adaptation control unit 601 and the right-eye image adaptation control unit 705 may not necessarily match. For example, in the scene where a state in which the left image is bright and the right image is dark continues, the influence of the crosstalk of the left image exerted on the right image is large, but the opposite influence is small. Therefore, the operations of the left-eye image adaptation control unit 601 and the right-eye image adaptation control unit 705 do not necessarily have to be the same (symmetric) at any time.

In the conversion units 602, 704, 706, and 707, based on the coefficients determined by the left-eye image adaptation control unit 601 and the right-eye image adaptation control unit 705, the signal levels of the input left-eye frame signal and the input right-eye frame signal are changed.

The synthesizing units 603 and 708 perform synthesis to reduce crosstalk based on the image signals for which signal levels are changed by the conversion units 602, 704, 706, and 707. As an example, the signals converted by the conversion units 602 and 706 are subtracted from the signals converted by the conversion units 704 and 707, respectively. Thus, the signal level for the crosstalk portion is subtracted from the image signal to be displayed in advance. The signals after this subtraction are provided, respectively.

As described above, in the above example, an example has been described in which the coefficients K1 and K3, and the coefficients K2 and K4 are dynamically (adaptively) determined by a relative comparison of signal level magnitudes between the left-eye frame signal and the right-eye frame signal. By determining the coefficients K1, K2, K3, and K4 based on the signal level ratios, which are the relative comparisons of image signal magnitudes between the inputted left-eye frame and right-eye frame, the coefficients are restrained in portions where inherently the crosstalk does not occur readily, and the crosstalk is cancelled by optimizing the coefficients so that they are no longer excessive or insufficient in portions where a crosstalk cancellation is needed and has a large effect, allowing a crosstalk cancellation processing in which the negative effects or the like due to cancellation coefficients having been raised excessively have been suppressed to be performed in portions where the effect of the crosstalk cancellation is small or in portions where the effect of the crosstalk cancellation is difficult to exert.

This allows crosstalk to be suitably cancelled according to the signal level of the image frame that is to be displayed. As a result, the crosstalk cancellation processing is weakened to eliminate negative effects in portions where no crosstalk cancellation is needed, or portions where the effect of the crosstalk cancellation is difficult to obtain, and the crosstalk cancellation processing is optimized by strengthening or weakening the crosstalk cancellation processing so that there are no excesses or insufficiency in portions where the effect of the crosstalk cancellation is readily obtained, allowing a more suitable image processing to be performed.

Note that although, in the above example, the result obtained by subtracting the image signal which exerts the influence of crosstalk from the image signal which is affected by the crosstalk is used as a signal level ratio, this embodiment is not limited thereto. As the indicator of another signal level ratio, $$\text{image signal which is affected by the crosstalk/image signal which exerts the influence of crosstalk} \quad \text{(Math. 1)}$$

or other indicators may be used. That is to say, any comparison method which can relatively compare signal levels of the image signal which is affected by the crosstalk and the image signal which exerts the influence of crosstalk may be used.

This embodiment allows crosstalk cancellation processing to be acted on efficiently, thus allowing more desirable image viewing.

Note that although, in this embodiment, the structure in which the CTC unit 412 has the conversion units 704 and 707 which convert an image signal based on the coefficients K3 and K4 has been described, the conversion units 704 and 707 may not be provided. Also in this case, the conversion units 602 and 706 and the synthesizing units 603 and 708 may operate based on the left-eye image adaptation control unit 601 and the right-eye image adaptation control unit 705 to cancel crosstalk.

Only by providing the conversion units 704 and 707 based on the coefficients K3 and K4, an effect of preventing the image signal to be generated from being extremely subtracted by the synthesizing units 603 and 708 can be obtained. Therefore, also in this case, more desirable image viewing becomes possible.

Embodiment 2

Figure 12:
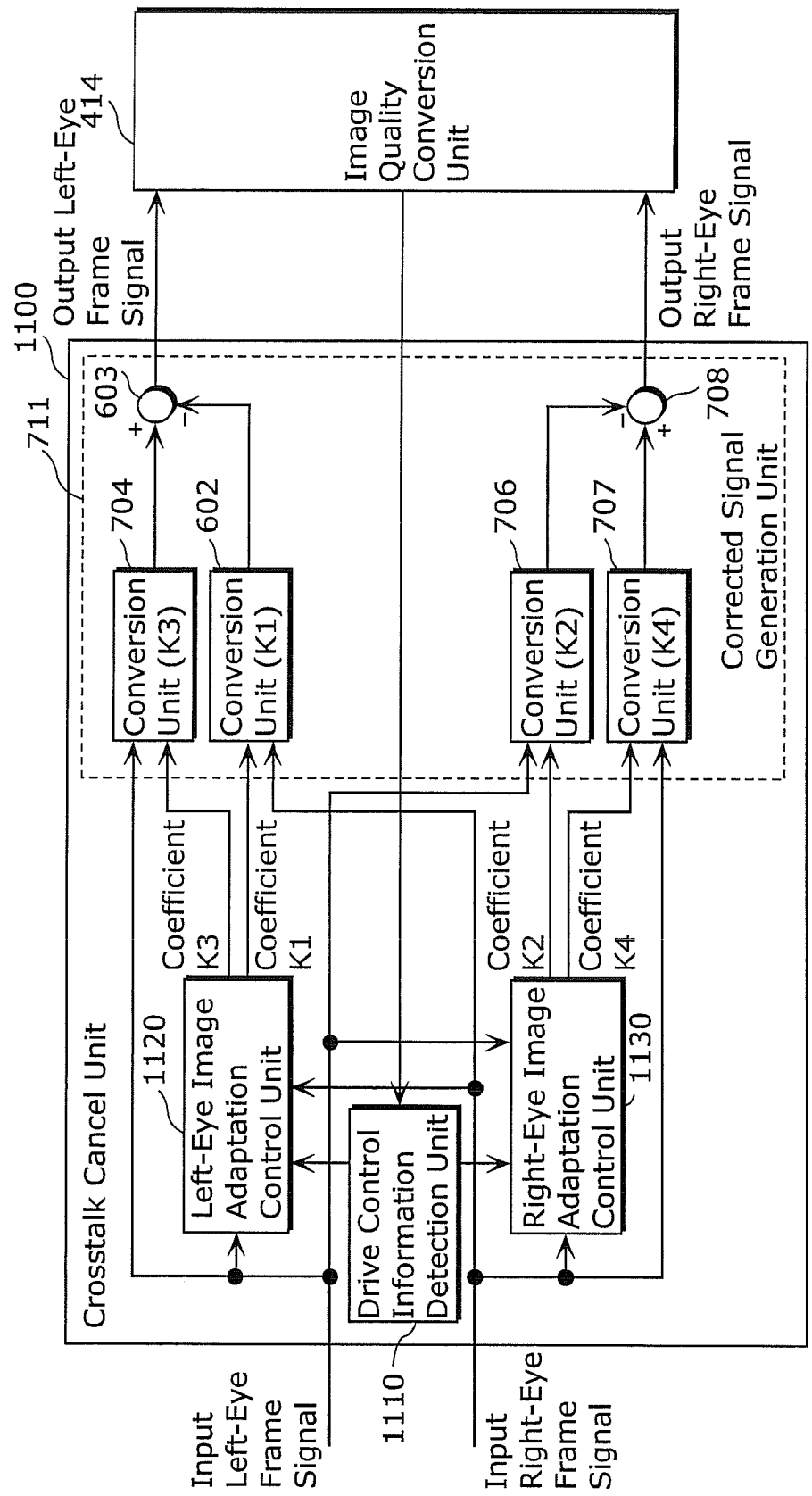
FIG. 12 is a diagram showing an example of the structure of CTC according to a second embodiment.

FIG. 12 shows a structure diagram of a CTC unit 1100 according to embodiment 2. The CTC unit according to embodiment 2 differs from the CTC unit 412 according to embodiment 1 in that the CTC unit 1100 according to embodiment 2 includes a drive control information detection unit 1110, a left-eye image adaptation control unit 1120, and a right-eye image adaptation control unit 1130. Since the CTC unit according to embodiment 2 is the same as the CTC unit 412 according to embodiment 1 in other structural units, the identical units are not explained again.

The drive control information detection unit 1110 obtains drive information from the image quality conversion unit 414 that is in the subsequent stage of the CTC unit 1100.

Figure 13:
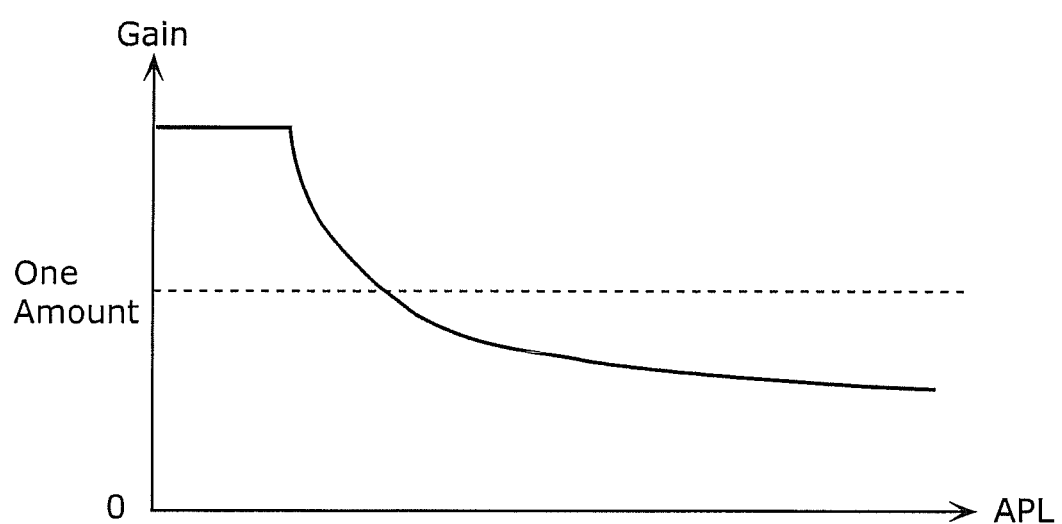
FIG. 13 is a graph plotting an example of the operation of APL of an image quality conversion unit.

The image quality conversion unit 414 performs adjustment such as alteration and modification of the part of an image signal to be generated according to the display characteristics of the display unit 408 as described above. FIG. 13 is a graph showing an example of a control method when the image quality conversion unit 414 performs APL (Average Picture Level) control.

The horizontal axis of the graph in FIG. 13 represents APL which indicates the average value of the brightness signals of the entire image frame that is inputted into the image quality conversion unit 414. The average brightness of the inputted image frame indicates that the farther to the right of the graph, the brighter the image is as a whole. Conversely, the farther to the left, the darker the image is meant. The vertical axis of FIG. 13 represents the value of the coefficient (gain) multiplied to the brightness signal of an image inputted into the image quality conversion unit 414. The farther to the upper side, the greater the value of the gain multiplied to the image signal is. Conversely, the farther to the downside, the smaller the value of the gain to be multiplied is.

According to the graph of FIG. 13, generally, when the APL of the inputted image frame is high, the value of the gain to be multiplied is reduced to be less than 1 so as to be an image that is darker than the same input signal. Conversely, when the APL is lower than a predetermined value, the value of the gain to be multiplied is increased to be larger than 1 so as to be an image that is brighter than the same input signal. By performing such processing, the image quality conversion unit 414 adjusts properly an image having an extremely high or low APL to display an image that is easily to view for a viewer, while at the same time devising display power saving.

Thus, as a result, the amount of the afterglow on the display to the same signal generation becomes large when the APL is low, and becomes low when the APL is high.

Note that not performing APL control amounts to multiplying by the equal scale gain value 1 in the entire APL domain (the dotted line in the graph of FIG. 13).

Even if the CTC unit 1100 performs such image signal processing that the occurrence of crosstalk can be suppressed therein, when the image quality conversion processing described above is performed in the subsequent stage, the image signal intended by the CTC unit 1100 may not be displayed on the display unit 408 finally. Therefore, the CTC unit 1100 must cancel crosstalk also in consideration of the image quality conversion processing performed by other function units, a processing algorithm, and the like.

Thus, the drive control information detection unit 1110 grasps the conversion contents and the like performed by another image quality conversion (image processing) in the image display apparatus. The drive control information detection unit 1110 grasps the image quality processing contents of the image quality conversion unit 414 based on the algorithm of processing performed by the image quality conversion unit 414, for example, information of graph showing the control of APL shown in FIG. 13, or the difference value between the image signal inputted into the image quality conversion unit 414 and the image signal provided by the image quality conversion unit 414, and the like. A description is provided below, where various types of information detected by the drive control information detection unit 1110 serve as drive control information.

The drive control information detection unit 1110 provides the detected drive control information to the left-eye image adaptation control unit 1120 and the right-eye image adaptation control unit 1130.

The left-eye image adaptation control unit 1120 receives, as input, the drive control information, the input left-eye frame signal, and the input right-eye frame signal from the drive control information detection unit 1110.

That is to say, the CTC unit 1100 according to this embodiment further includes the drive control information detection unit 1110 in addition to the components of the CTC unit 412 according to the first embodiment.

The left-eye image adaptation control unit 1120 (or right-eye image adaptation control unit 1130) uses the input left-eye frame signal (or input right-eye frame signal) that is the first image signal, the input right-eye frame signal (or input left-eye frame signal) which is the second image signal, and the drive control information detected by the drive control information detection unit 1110 to determine K1 (or K2) which is the first coefficient and K3 (or K4) which is the second coefficient.

The drive control information detection unit 1110 detects the drive control information which represents the change contents performed by the image quality conversion unit 414 which is in the subsequent state of the CTC unit 1100 in the image signal processing unit 407.

Here, the image quality conversion unit 414 calculates the APL indicating the average value of the brightness signals of the entire frame in the image signal provided by the corrected signal generation unit 711, and determines the image quality conversion gain so that the larger the APL, the smaller the gain becomes. Thereafter, the image signal is multiplied by the image quality conversion gain, which is in turn provided.

Next, the drive control information detection unit 1110 detects the magnitude of the image quality conversion gain as drive control information.

Next, the left-eye image adaptation control unit 1120 (or the right-eye image adaptation control unit 1130) determines the first coefficient K1 (or K2) and the second coefficient K3 (or K4) in such a way that the larger the signal level of the second image signal relative to the signal level of the first image signal, and the larger the magnitude of the image quality conversion gain, the larger the coefficients become.

The details will be provided below.

Figure 14:
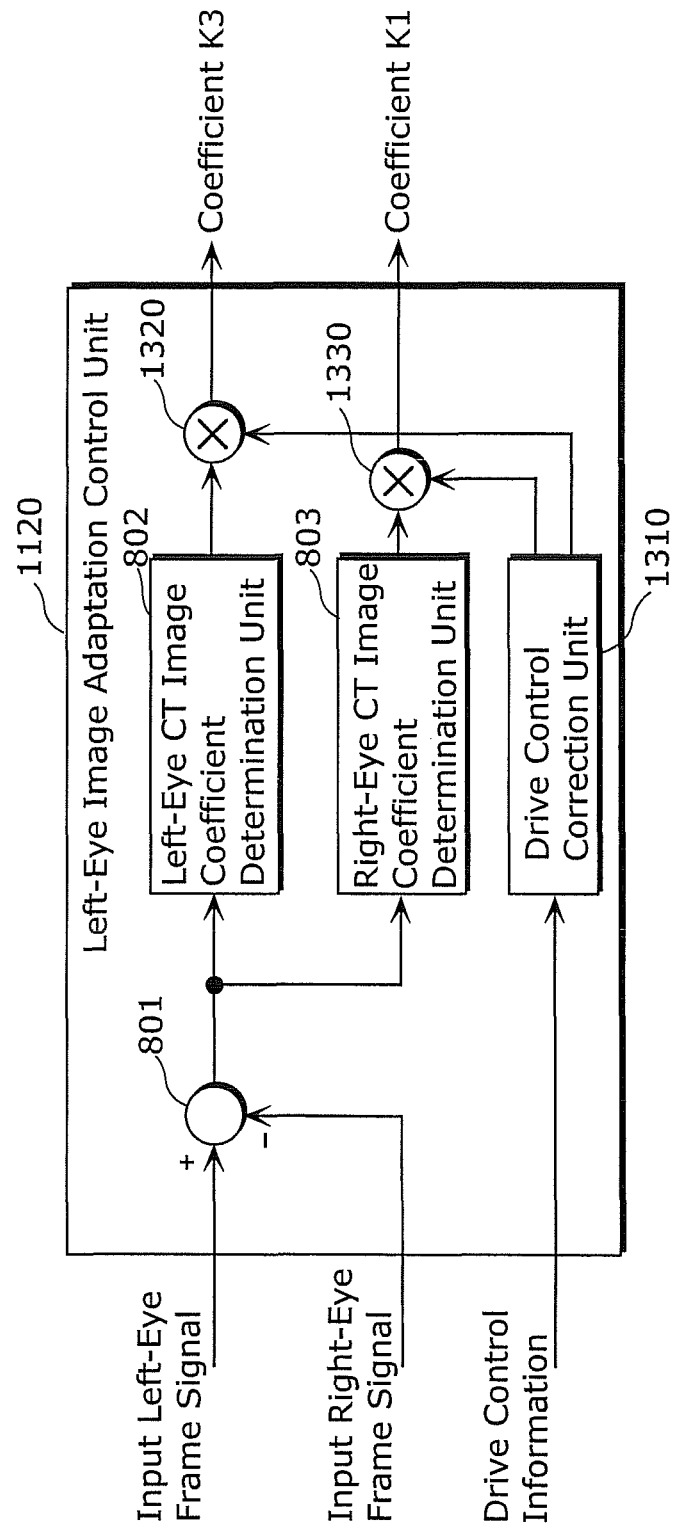
FIG. 14 is a diagram showing an example of the structure of a left-eye image adaptation control unit according to the second embodiment.

The structure of the left-eye image adaptation control unit 1120 is shown in FIG. 14. In FIG. 14, the signal comparison unit 801, the left-eye CT image coefficient determination unit 802, and the right-eye CT image coefficient determination unit 803 are common to the left-eye image adaptation control unit 601 shown in FIG. 9. Therefore, the description thereof will be omitted here. The left-eye image adaptation control unit 1120 differs from the left-eye image adaptation control unit 601 in that the left-eye image adaptation control unit 1120 includes a drive control correction unit 1310, and multiplication units 1320 and 1330.

The drive control correction unit 1310 determines an adjustment value for adjusting the gain coefficient determined by each of the left-eye CT image coefficient determination unit 802 and the right-eye CT image coefficient determination unit 803 in consideration of the image processing performed by the image quality conversion unit 414 and the like. In the case where the image quality conversion unit 414 performs the quality conversion processing based on the APL shown in FIG. 13, in the portions where the APL is relatively low, the drive control correction unit 1310 tries to perform multiplication of high gain, and in the portion where the APL is relatively high, the drive control correction unit 1310 tries to perform multiplication of low gain. Then, the drive control correction unit 1310 adjusts the gain determined by the left-eye CT image coefficient determination unit 802 and the right-eye CT image coefficient determination unit 803 based on the drive control information detected by the drive control information detection unit 1110.

Figure 15:
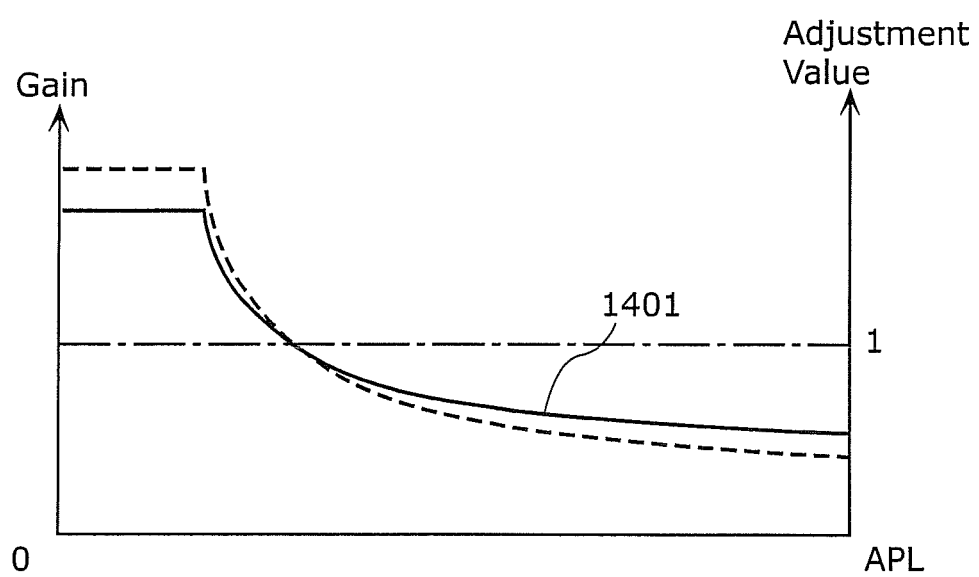
FIG. 15 is a graph plotting a coefficient adjustment determined by a drive control correction unit.

In the example of the APL of FIG. 13, the drive control correction unit 1310 calculates the adjustment value as shown in the graph 1401 of FIG. 15 based on the value of the gain multiplied by the image quality conversion unit 414. As described above, since the amount of afterglow on the display relative to the same signal generation is large when the APL is low, and small when the APL is high, the adjustment value may be controlled so that the coefficients K1 and K3 become large in the portions where the APL is low, and the coefficients K1 and K3 become low in the portions where the APL is high; consequently, the adjustment value has the same characteristics as that of FIG. 13.

The adjustment value determined by the drive control correction unit 1310 is multiplied to the coefficient K3 determined by the left-eye CT image coefficient determination unit 802, and the coefficient K1 determined by the right-eye CT image coefficient determination unit 803 by the multiplication units 1320 and 1330, respectively. Thus, the processing performed by the CTC unit 1100 based on the coefficients K1 and K3 is crosstalk cancellation processing in consideration of the conversion contents of the image quality conversion unit 414. As a result, more desirable image viewing becomes possible.

Note that although, in this embodiment, a case where the APL is used as image quality conversion processing performed by the image quality conversion unit 414 has been described as an example, this invention is not limited thereto. Other image quality processing may be those that handle various types of image quality conversion processing, such as, for example, color conversion processing, which adjusts the displayed colors according to the coloring characteristics of the display unit 408, external lighting-based adaptation control processing, which changes the luminosity signal of an image according to the external lighting condition, and color gamut conversion, which changes the color gamut of the input image signal and the output image signal.

In addition, although, in the example of FIG. 15, an example using adjustment values which contents are linked proportionally to the image quality conversion processing performed by the image quality conversion unit 414 has been described, this embodiment is not limited thereto. That is to say, it suffices that the CTC unit 1100 described according to this embodiment changes the contents of the CTC according to another processing such as image quality conversion.

Further, although, in this embodiment, a case where the image quality conversion unit 414 is provided in the subsequent stage of the CTC unit 1100 has been described as an example, the image quality conversion unit 414 may be the processing in the previous stage of the CTC unit 1100. However, when the image quality conversion unit 414 is in the previous stage of the CTC unit 1100, the processing contents of the image quality conversion unit 414 is reflected in the input of the CTC unit 1100. Therefore, as the effect, it is more efficient in the case where the image quality conversion unit 414 is processed in the subsequence stage of the CTC unit 1100 or in parallel to the CTC unit 1100.

In addition, the processing of the image quality conversion unit 414 and the CTC unit 1100 may be performed in parallel. In this case, similarly to the above example, the CTC unit 1100 performs CTC processing in consideration of the processing contents of the image quality conversion unit 414 in advance.

In addition, needless to say, although this embodiment has been described using the left-eye image adaptation control unit 1120, the same processing may be performed for the right-eye image adaptation control unit 1130.

As described above, when cancelling crosstalk, the CTC unit 1100 according to this embodiment cancels crosstalk according to not only the input signal of a frame image but also other image quality conversion processing contents, allowing a more desirable image to be displayed.

Embodiment 3

Figure 16:
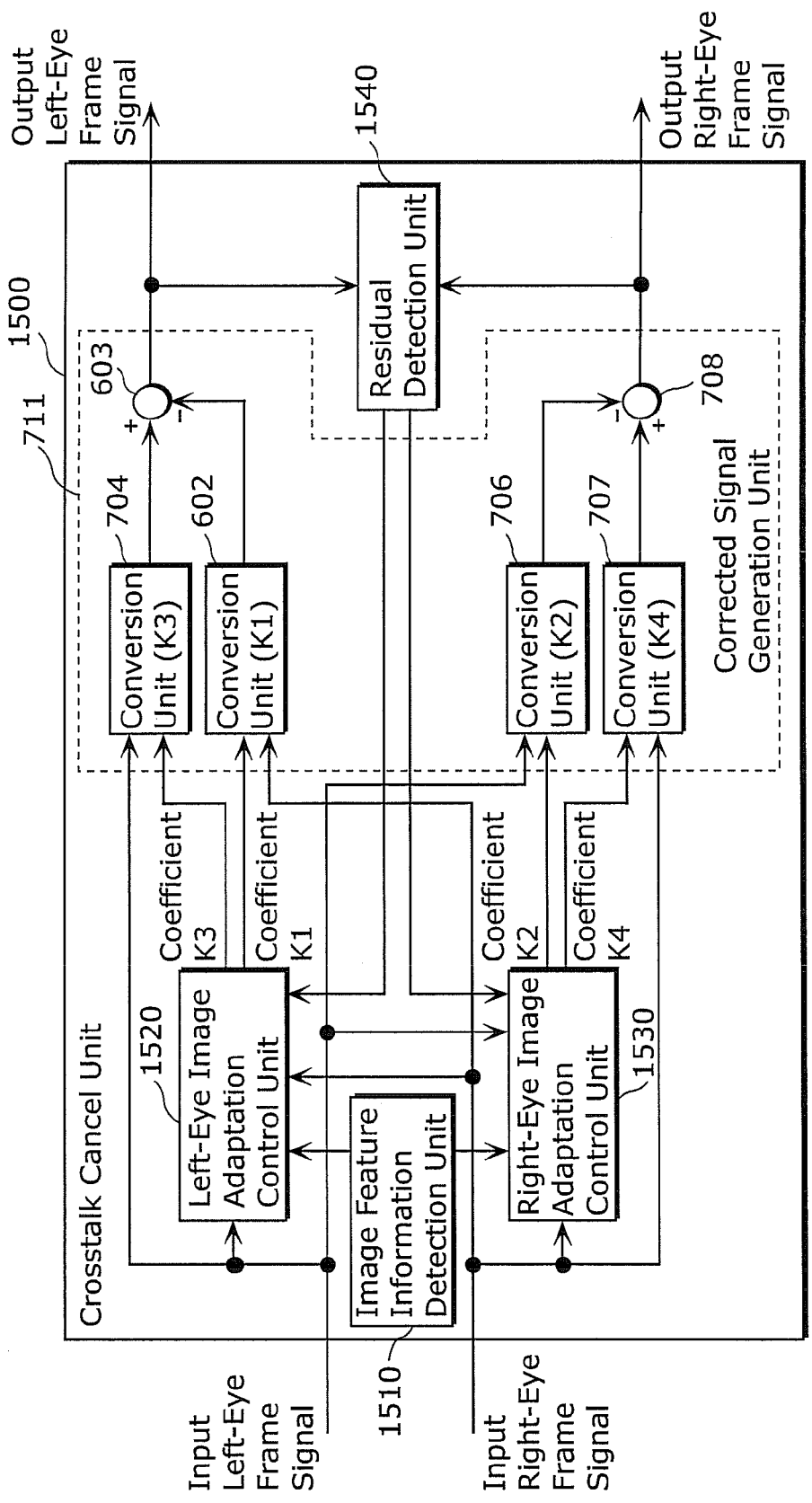
FIG. 16 is a diagram showing an example of the structure of CTC according to a third embodiment.

The functional structure diagram of a CTC unit 1500 according to a third embodiment is shown in FIG. 16. The CTC unit 1500 according to embodiment 3 differs from the CTC unit 412 according to embodiment 1 in that the CTC unit 1500 further includes an image feature information detection unit 1510, a left-eye image adaptation control unit 1520, a right-eye image adaptation control unit 1530, and a residual detection unit 1540. Since the CTC unit 1500 according to embodiment 3 is the same as the CTC unit 412 according to embodiment 1 in other structural unit, the identical units are not explained again.

The image feature information detection unit 1510 extracts the feature of the image from the input left-eye frame signal and input right-eye frame signal. The feature of the image includes the average brightness of an inputted image frame, for example. The average brightness of the image frame can be obtained by calculating the average value of the brightness of the entire pixels constituting the frame. In this case, image feature information can be obtained for a scene in which the inputted image is bright, a scene in which the inputted image is dark, or the like. In addition, detecting the maximum value and the minimum value of the brightness signal of the entire pixels constituting the frame allows the contrast of the display scene to be detected.

As another example, the color constituting the inputted image frame, for example, the occurrence frequency of R (Red), G (Green), and B (Blue) constituting the image signal, and the distribution state on the image frame plane can be detected as features. When the input signal is constituted by R, G, and B, they can be calculated based on such occurrence frequency in the image frame, and the signal level. From the viewpoint of crosstalk (afterglow), in the case of a PDP, for example, since the afterglow is prone to remain in order of green, red, and blue, the occurrence frequency of the color and the like is extracted as image feature information.

In addition, as another example, when a scene is changed largely, in other words, when the composition is changed largely before and after the frames constituting the image, this is detected. This detection allows for the understanding that the scene changes considerably when the magnitude of the difference between successive frames at each pixel, as an entire frame, is larger than a predetermined reference. Alternatively, the change of the scene can also be detected by statistically analyzing the variation amount of the average brightness. When the scene is largely changed, changing the processing contents of the crosstalk cancellation until then is sometimes required. This image feature information can be used as timing information for another update for the crosstalk control. By performing such control, the crosstalk cancellation control can be performed more efficiently.

There are many aspects to image features to be extracted as described above. Although the above description has been provided by taking as an example brightness of the image, the occurrence frequency of the color, the distribution state, scene change and the like, this embodiment is not limited thereto. That is to say, any image feature which is calculated based on the inputted image signal can be used.

The image feature information detection unit 1510 further extracts such image features as those described above by comparison between the right and left image signals. For example, when the left image shows a bright scene, and the right image shows a dark scene, the comparison of the brightness between the right image and the left image is also extracted as an image feature. Such the contrast comparison between the right image and the left image may be another image feature in addition to the brightness of the scene described above.

From the output right-eye and left-eye image signals in which the crosstalk is cancelled by the CTC unit 1500, the residual detection unit 1540 detects a residual fraction which remains due to an incomplete cancellation by crosstalk cancellation processing. Although the CTC unit 1500 performs processing for cancelling or suppressing the crosstalk, there is a case where cancelling or suppressing crosstalk is difficult depending on the situation. For example, in the left-eye frame 901 in FIG. 11, since the right-eye image signal (right-eye frame 900) is considerably larger than the left-eye image signal, the afterglow component of the right-eye frame is larger than the left-eye image signal, which prevents a complete cancellation thereof, leaving the amount (the right-eye image afterglow−left-eye image signal). The residual detection unit 1540 detects the remaining crosstalk as a residual.

More specifically, by detecting the minus portion of the output signals from the synthesizing units 603 and 708, the residual fraction can be detected readily. In order to detect the residual fraction more accurately, the signal level ratio of the output left-eye frame signal and the output right-eye frame signal, the difference between both signals, and information obtained by a predetermined calculation method to compare both signals are also taken into consideration.

In addition, by integrating this residual fraction for one frame and analyzing the amount of variation in this integrated value, it is possible to detect the extent of the residual fraction occurring in this scene. The residual detection unit 1540 detects the residual fraction from the output image signal with the method in the above example. Note that other methods for detecting a residual fraction may be used without limited thereto.

The residual fraction determined by the detection or calculation by the residual detection unit 1540 is provided to the left-eye image adaptation control unit 1520 and the right-eye image adaptation control unit 1530. Note that the residual detection unit 1540 performs detection on each of the left-eye frame and the right-eye frame.

The left-eye image adaptation control unit 1520 receives, as input, the input left-eye frame signal and the input right-eye frame signal which are inputted into the CTC unit 1500, the image feature information provided by the image feature information detection unit 1510, and the information of the residual fraction provided by the residual detection unit 1540.

Figure 17:
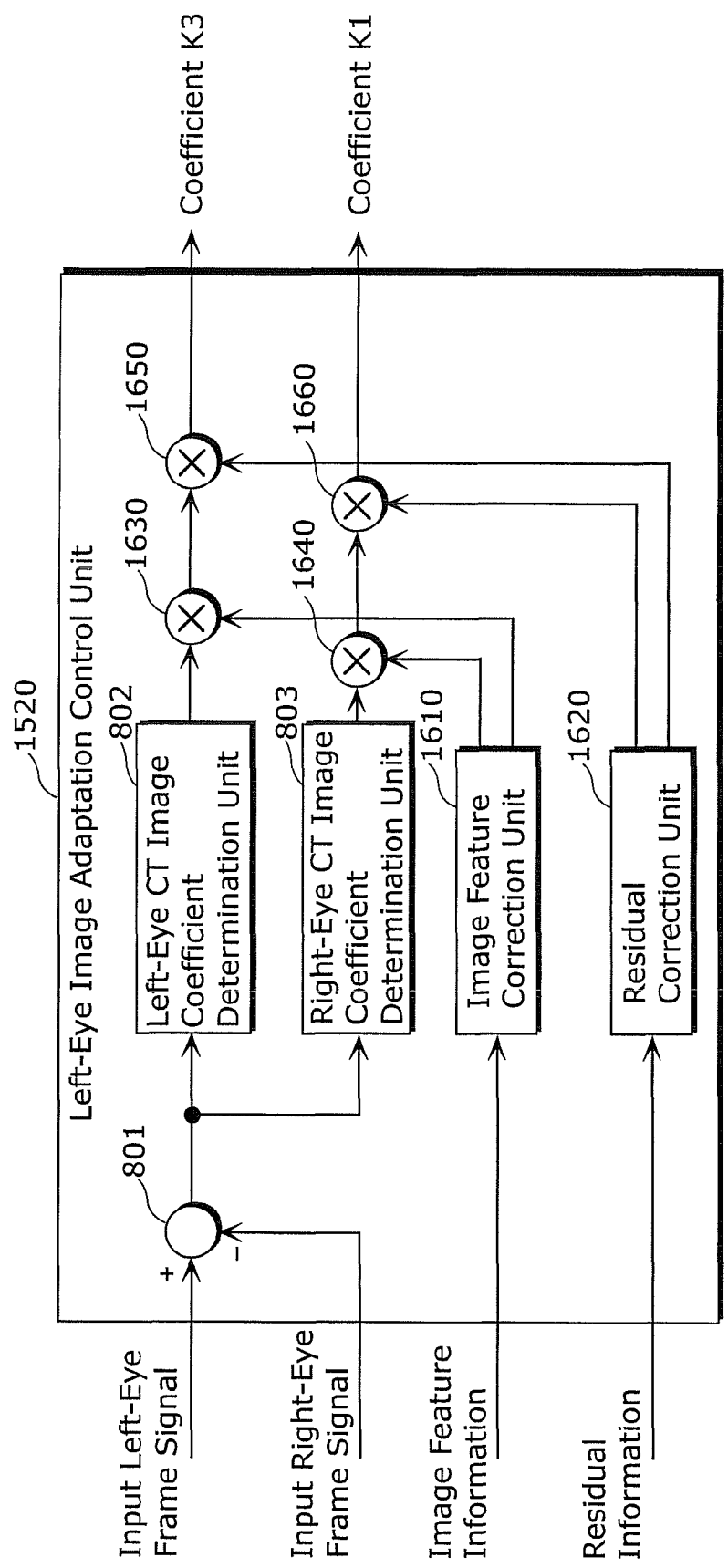
FIG. 17 is a diagram showing an example of the structure of a left-eye image adaptation control unit according to the third embodiment.

FIG. 17 is a diagram showing the functional structure of the left-eye image adaptation control unit 1520. The left-eye image adaptation control unit 1520 according to embodiment 3 differs from the left-eye image adaptation control unit 1120 according to embodiment 2 in that an image feature correction unit 1610, a residual correction unit 1620, multiplication units 1630, 1640, 1650, and 1660 are added, and the drive control correction unit 1310, and the multiplication units 1320 and 1330 are eliminated. Since the left-eye image adaptation control unit 1520 according to embodiment 3 is the same as the left-eye image adaptation control unit 1120 according to embodiment in other structural units, the identical units are not described again.

The image feature correction unit 1610 adjusts the coefficient for crosstalk cancellation determined by the left-eye CT image coefficient determination unit 802 and the right-eye CT image coefficient determination unit 803 based on the image feature information detected by the image feature information detection unit 1510. More specifically, the image feature correction unit 1610 determines an adjustment value that is additionally multiplied to these coefficients. For example, in the case where the image feature information is color distribution information, when the distribution of green is large, a different control from other colors is required owing to the green color having a large crosstalk (afterglow) influence. Then, the image feature correction unit 1610 determines an adjustment value multiplied to each of coefficients determined by the left-eye CT image coefficient determination unit 802 and the right-eye CT image coefficient determination unit 803 so as to enhance the coefficients. Actually, since, as described later, the left-eye image adaptation control unit 1520 exists for each of R, G, and B, if a scene has a large amount of green components according to the result of the image feature information detection, the operation of enhancing the coefficients is to be performed only by the image feature correction unit 1610 of the left-eye image adaptation control unit 1520.

In addition, as another correction example in the image feature correction unit 1610, in the case where the image feature information is the average brightness value information, when there are many relatively bright images, since the influence of crosstalk does not occur readily, the image feature correction unit 1610 determines an adjustment value multiplied to each of coefficients determined by the left-eye CT image coefficient determination unit 802 and the right-eye CT image coefficient determination unit 803 so as to attenuate the coefficients. Conversely, when there are many relatively dark images, since the influence of crosstalk occurs readily, an adjustment value multiplied to each of the coefficients is determined so as to enhance the coefficients.

The adjustment value determined by the image feature correction unit 1610 is multiplied to each of the coefficients (gains) determined by the left-eye CT image coefficient determination unit 802 and the right-eye CT image coefficient determination unit 803 by the multiplication units 1630 and 1640.

That is to say, compared with the CTC unit 412, the CTC unit 1500 according to this embodiment further includes the image feature information detection unit 1510 which detects feature information of the image signal inputted based on at least one of the input left-eye frame signal (or input right-eye frame signal) which is the first image signal, and the input right-eye frame signal (or input left-eye frame signal) which is the second image signal.

In addition, the left-eye image adaptation control unit 1520 (or right-eye image adaptation control unit 1530) determines K1 (or K2) which is the first coefficient and a second coefficient K3 (or K4) based on the input left-eye frame signal (or input right-eye frame signal) which is a first image signal, the input right-eye frame signal (or input left-eye frame signal) which is the second image signal, and the feature information of the image signal.

More specifically, as feature information, the image feature information detection unit 1510 detects for an inputted image frame at least one among the average brightness, the signal level of each signal R (Red), G (Green), and B (Blue) constituting the image frame, and the pixel-by-pixel differences between frames.

Next, the left-eye image adaptation control unit 1520 (or right-eye image adaptation control unit 1530) determines K1 (or K2) which is the first coefficient, and the second coefficient K3 (or K4) in such a way that the smaller the average brightness of the image frame, or the stronger the G (Green) signal among the RGB signals constituting the image frame compared with the other signals, or the larger the signal level of the second image signal relative to the signal level of the first image signal, the larger the coefficients become.

Note that, in addition, descriptive statistical quantities such as the maximum value, minimum value, medium value, quartile, kurtosis, skewness and the like of the brightness of the frame may be used individually or in combination as feature information.

At that time, preferably, K1 (or K2) which is the first coefficient and the second coefficient K3 (or K4) are determined in such a way that they become larger when the tendency of the brightness of the entire frame which is meant by these descriptive statistical quantities is to be lower. The reason is, since the darker the scene, the more likely is the crosstalk to occur, a strong application of crosstalk cancellation processing is required.

In addition, the disparity between left and right may also be used as feature information. In this case, since when the disparity between right and left is larger, the influence of crosstalk being more likely to be exhibited, preferably, K1 (or K2) which is the first coefficient and the second coefficient K3 (or K4) are determined in such a way that they become larger.

However, the disparity between right and left does not mean so-called simple disparity. That is to say, the value from the integration, for all the pixels i contained in the frame, of the values obtained by subtracting the signals of the pixels i contained in the input right-eye frame signal from the signals of the pixels i contained in the input left-eye frame signal (or values obtained by subtracting the signals of the pixels i contained in the input left-eye frame signal from the signals of the pixels i contained in the input right-eye frame signal) is herein referred to "disparity between right and left".

The residual correction unit 1620 determines an adjustment value which further adjusts the coefficients that have been adjusted by the multiplication units 1630 and 1640 based on the residual information detected by the residual detection unit 1540. The residual correction unit 1620 further monitors the image signal in which crosstalk is cancelled by the CTC unit 1500 to determine an adjustment value to further correct the coefficients determined by the left-eye CT image coefficient determination unit 802, the right-eye CT image coefficient determination unit 803, and the image feature correction unit 1610.

More specifically, for example, when the amount of residual fractions integrated for one frame detected by the residual detection unit 1540 is large, the image scene can be determined to have conditions under which residual fractions occur readily. Therefore, the residual correction unit 1620 determines an adjustment value multiplied to each of the coefficients so as to enhance the coefficients.

Conversely, since as residual information, when there is almost no residual fraction, since it can be determined that the scene is bright and that crosstalk cancellation processing can operate efficiently, the adjustment value determined by the residual correction unit 1620 can be a value that is close to 1 (very little correction).

Further, in such cases as where identical scenes continue to some extent, in which residual fractions occur, in the case of a situation where there is little variation in the residual fractions as the original input image signal, controlling the adjustment value so as to control that the residual fraction to become smallest amounts to performing an operation corresponding to feedback control as coefficient control.

In the structure described above, finally, the coefficients K1 and K3 can be obtained from the left-eye image adaptation control unit 1520. Similarly to other embodiments, they are multiplied to the image signal by the conversion units 602 and 704, and then, the difference is calculated by the synthesizing unit 603.

Note that since the right-eye image adaptation control unit 1530 has the same structure as that of the left-eye image adaptation control unit 1520, the description thereof will be omitted.

That is to say, compared with the CTC unit 412, the CTC unit 1500 according to this embodiment further includes the residual detection unit 1540 which detects a residual fraction caused by the afterglow component of the second image signal included in the synthesized image signal synthesized by the synthesizing unit 603.

In addition, the left-eye image adaptation control unit 1520 (or right-eye image adaptation control unit 1530) uses the input left-eye frame signal (or input right-eye frame signal) that is the first image signal, the input right-eye frame signal (or input left-eye frame signal) which is the second image signal, and the residual fraction to determine K1 (or K2) which is the first coefficient and K3 (or K4) which is the second coefficient.

As an example of specifically applying the residual fraction to the control of the coefficient as image feature information of the three-dimensional image, the left-eye image adaptation control unit 1520 (or right-eye image adaptation control unit 1530) determines K1 (or K2) which is the coefficient and K3 (or K4) which is the second coefficient in such a way that the larger the residual fraction, and the larger the signal level of the second image signal relative to the signal level of the first image signal, the larger the coefficients become. This is based on the control concept of enhancing the crosstalk cancelling processing from the fact that the larger the residual fraction, the larger the amount (the larger the area) of pixels which are affected by the crosstalk in general.

As described above, the CTC unit 1500 according to this embodiment corrects crosstalk cancellation processing based on the image feature of an inputted image and the residual fraction in the output result of crosstalk cancellation processing, thus more desirable images can be obtained.

Note that, although, in this embodiment, the case where the image feature information detection unit 1510 and the residual detection unit 1540 are used in combination has been described, only one of them may be used. Even if only one of them is used, desirable images can be obtained.

Note that although, in all embodiments described above, the description has been provided by taking an example in which crosstalk is reduced when a three-dimensional image is viewed in which the right and left images are different by the amount of disparity, this embodiment is not limited thereto. For example, needless to say, also when the image display apparatus displays a first image (contents) and a second image which is not related to the first image alternatively on a frame-by-frame basis, the crosstalk cancellation which has been described in this embodiment can also be used.

Figure 18:
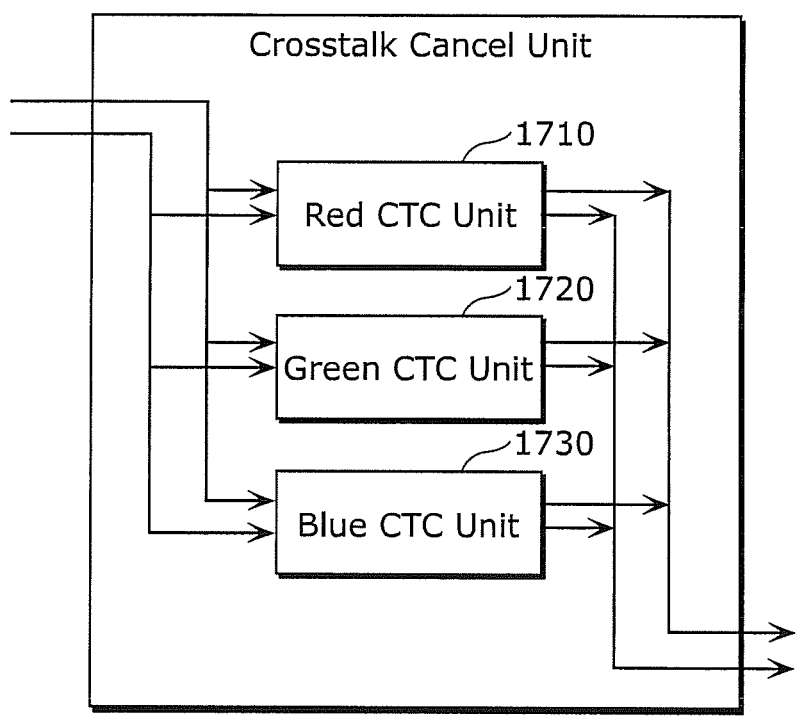
FIG. 18 is a diagram showing a case where a CTC unit is adapted to each of R, G, and B.

In addition, although, in this embodiment, an input left-eye frame signal and an input right-eye frame signal have been described as input signals into the CTC unit for purposes of illustration, actually, since an input left-eye frame signal and an input right-eye frame signal include each signal from the RGB signals, allowing RGB to be controlled individually as shown in FIG. 18 is desirable. Thus, crosstalk can be cancelled with respect to all original colors, allowing more desirable image to be obtained. Note that each of an R-CTC unit 1710, a G-CTC unit 1720, and a B-CTC unit 1730 shown in FIG. 18 has right and left crosstalk cancellation processing functions therein.

In this case, the image display apparatus has red, green, and blue crosstalk cancellation functions for each of right and left eyes.

When R, G, and B are used, the features of the crosstalk (afterglow) are different from color to color. Therefore, regarding the determination of the coefficients, the determination method and the determination value may be different from color to color. In the case of RGB of a PDP, since the afterglow is large in order of green (G), red (R), and blue (B), the determination of coefficients in crosstalk cancellation is set in such a way that the effect is increased in order of green, red, and blue. Similarly to this example, controls of crosstalk cancellation may be performed, which are different according to the feature of each color. Also in this case, desirable image viewing becomes possible.

Note that although, in the above example, the three primary colors have been described by taking as an example the case of the additive color mixing RGB, this embodiment is not limited thereto. For example, the subtractive color mixing of cyan, magenta, and yellow may be used.

Note that in any embodiments described above, an example has been described where the crosstalk cancellation processing is achieved in hardware like the image signal processing IC 307.

Such hardware is typically achieved as an IC which is an integrated circuit. Some pieces of hardware may be formed into one chip each, or may be formed into one chip so as to contain a portion or the entirety.

Here, the IC is used, but this is sometimes referred to as an LSI, a system LSI, a super LSI, and an ultra LSI depending on the difference in the degree of integration.

In addition, the integrated circuit is not limited to an IC and an LSI, and may be achieved by a dedicated circuit or a general-purpose processor. An FPGA (Field Programmable Gate Array) which can be programmed after LSI manufacturing, or a reconfigurable processor which can reconfigure the connection and setting of a circuit cell within the LSI may be used.

Furthermore, if, owing to the progress of semiconductor technology or a derivative other technique, a technique of forming an integrated circuit that replaces the LSI appears, the technique may be used to integrate each processing unit, naturally.

Moreover, a processor such as a CPU may perform a program to achieve some or all of the functions of the image signal processing device according to embodiments of the present invention.

Further, this invention may be the above program, or a recording medium on which the program is recorded. In addition, needless to say, the program may be distributed via a transmission medium such as the Internet.

Figure 19:
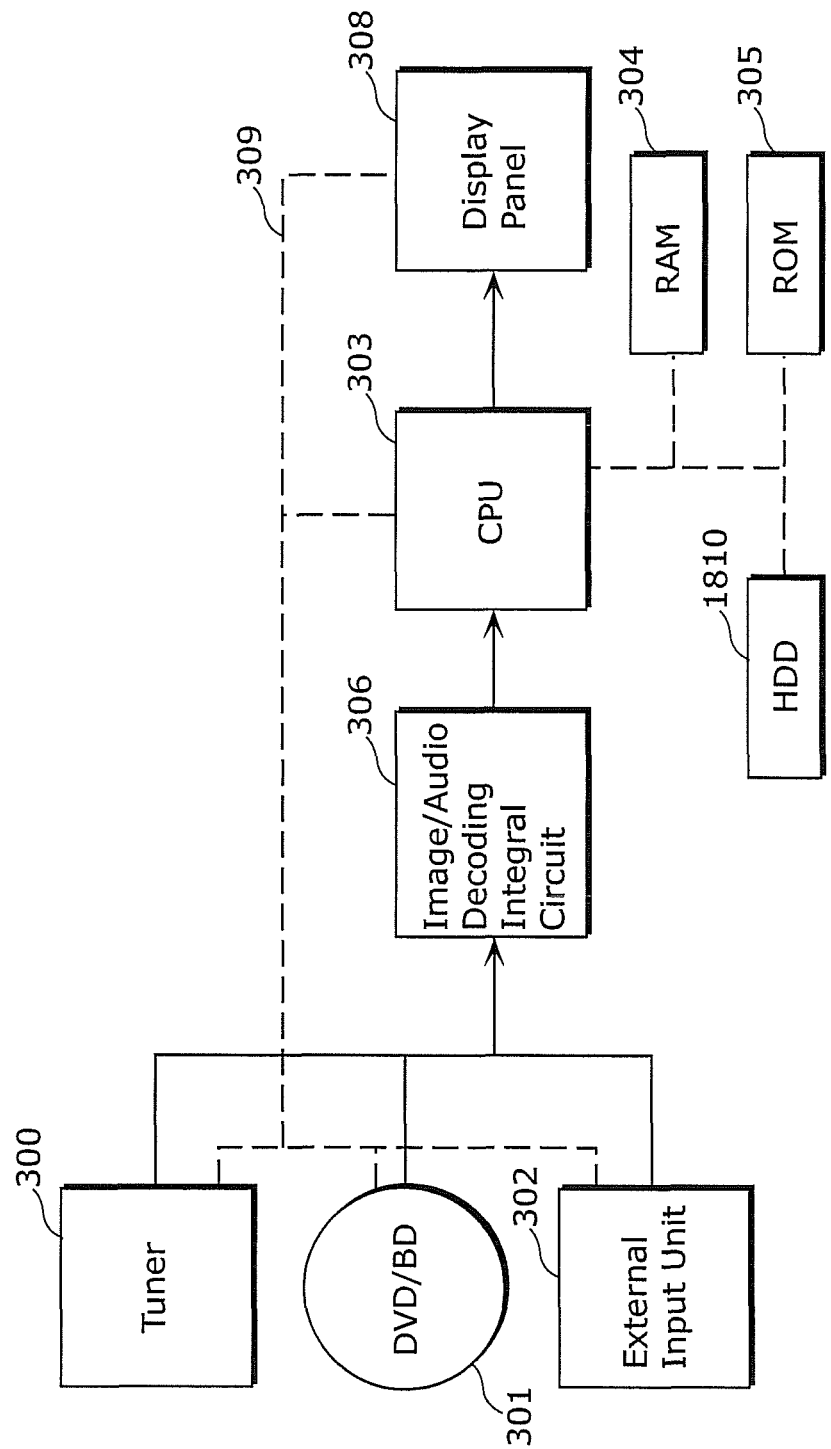
FIG. 19 is a diagram showing an example of the functional structure of an image display apparatus in the case that image signal processing is implemented by software.

An example of the structure by which this invention is achieved in software and the like is shown in FIG. 19. In FIG. 19, the difference from the structure of FIG. 3 is that a CPU is used instead of the image signal processing IC 307. The CPU 303 includes the RAM 304 and the ROM 305 similarly to the case of FIG. 3, and connects to a mass storage device such as an HDD (Hard Disk Drive) 1810.

In this case, the CPU 303 inputs an image signal decoded by the image/audio decoding IC 306, and performs signal processing of crosstalk cancellation processing based on the software processing, such as described above in the above embodiment. The CPU 303 accumulates an image signal in which crosstalk has been cancelled in an HDD 1810.

The CPU 303 reads out the image signal recorded in the HDD 1810 and subjected to crosstalk cancellation processing, and provides the image signal to the display panel 308 if needed. The display panel 308 displays the image signal subjected to the crosstalk processing, which is transmitted from the CPU 303.

With the above structure, cancelling crosstalk in the image signal by software similarly to processing by the image signal processing IC 307 becomes possible. In addition, by recording in the HDD 1810 the image signal subjected to the crosstalk cancellation processing once, if the same image is to be displayed multiple times on the display panel 308, simply reading the processed data recorded in the HDD 1810 with the CPU 303 to display image becomes possible. Note that when recording the image signal in the HDD 1810, processing such as encoding may be performed in combination for the purpose of reducing the amount of data to be recorded.

INDUSTRIAL APPLICABILITY

The invention of this application may be used for an image display apparatus which displays images. In particular, this invention can be used for a three-dimensional display apparatus which displays image frames alternatively in which the disparity is different between right and left, an image display apparatus that changes and displays a plurality of images (contents) by switching at each frame, and the like.

NUMERICAL REFERENCES

100 Image Display Apparatus
110, 413 Synchronization Signal Transmission Unit 120 A Pair of Eyeglasses for Image Viewing
130 Synchronization Signal Reception Unit
200 Sub field
300 Tuner
301 DVD/BD
302 External Input Unit
303 CPU
304 RAM
305 ROM
306 Image/Audio Decoding IC
307 Image Signal Processing IC
308 Display Panel
309 Bus
406 Image/Audio Decoding Unit
407 Image Signal Processing Unit
408 Display Unit
411 Frame Rate Conversion Unit
412, 1100, 1500 Crosstalk Cancel Unit
414 Image Quality Conversion Unit
601, 1120, 1520 Left-Eye Image Adaptation Control Unit
602, 704, 706, 707 Conversion Unit
603, 708 Synthesizing Unit
604, 711 Corrected Signal Generation Unit
705, 1130, 1530 Right-Eye Image Adaptation Control Unit
801 Signal Comparison Unit
802 Left-Eye CT Image Coefficient Determination Unit
803 Right-Eye CT Image Coefficient Determination Unit
900 Right-Eye Frame
901 Left-Eye Frame
1110 Drive Control Information Detection Unit
1310 Drive Control Correction Unit
1320, 1330, 1630, 1640, 1650, 1660 Multiplication Unit
1510 Image Feature Information Detection Unit
1540 Residual Detection Unit
1610 Image Feature Correction Unit
1620 Residual Correction Unit
1710 R-CTC Unit
1720 G-CTC Unit
1730 B-CTC Unit
1810 HDD

The invention claimed is:

1. An image signal processing device that cancels crosstalk in three-dimensional (3D) image signals, said image signal processing device comprising:
an image adaptation control unit configured to
(i) receive a first image signal and a second image signal, the first image signal being one of a left-eye image signal and a right-eye image signal which correspond to each other in the inputted 3D image signals, and the second image signal being an other one of the left-eye image signal and the right-eye image signal, and
(ii) determine a first coefficient and a second coefficient such that the larger a signal level of the second image signal relative to a signal level of the first image signal, the larger the first coefficient and the second coefficient become in at least a predetermined range, when the signal level of the first image signal is compared to the signal level of the second image signal;
a first conversion unit configured to convert the second image signal based on the first coefficient determined by said image adaptation control unit;
a second conversion unit configured to convert the first image signal based on the second coefficient determined by said image adaptation control unit; and
a corrected signal generation unit configured to correct the first image signal by subtracting the second image signal converted by said first conversion unit from the first image signal converted by second conversion unit.

2. The image signal processing device according to claim 1,
wherein said image adaptation control unit is configured to compare a signal level of each of a plurality of pixel signals included in the second image signal to a signal level of a corresponding one of a plurality of pixel signals included in the first image signal so as to determine the first coefficients and the second coefficients, the first coefficients and the second coefficients include coefficients corresponding to the respective plurality of pixel signals included in the second image signal.

3. The image signal processing device according to claim 1,
wherein said image adaptation control unit is configured to compare an average signal level of a plurality of pixel signals included in the second image signal to an average signal level of a plurality of pixel signals included in the first image signal so as to determine the first coefficient and the second coefficient.

4. An image signal processing method that cancels crosstalk in three-dimensional (3D) image signals, said image signal processing method comprising:
receiving a first image signal and a second image signal, the first image signal being one of a left-eye image signal and a right-eye image signal which correspond to each other in the inputted 3D image signals, and the second image signal being an other one of the left-eye image signal and the right-eye image signal;
determining a first coefficient and a second coefficient such that the larger a signal level of the second image signal relative to a signal level of the first image signal, the larger the first coefficient and the second coefficient become in at least a predetermined range, when the signal level of the first image signal is compared to the signal level of the second image signal;
converting the second image signal based on the first coefficient determined in said determining;
converting the first image signal based on the second coefficient determined in said determining; and
correcting the first image signal by subtracting the second image signal converted in said converting of the second converting from the first image signal converted in said converting of the first converting.

* * * * *